US011658021B2

(12) United States Patent
Bryden et al.

(10) Patent No.: US 11,658,021 B2
(45) Date of Patent: May 23, 2023

(54) SYSTEMS AND METHODS OF RAPID AND AUTONOMOUS DETECTION OF AEROSOL PARTICLES

(71) Applicant: Zeteo Tech, Inc., Sykesville, MD (US)

(72) Inventors: Wayne A. Bryden, Sykesville, MD (US); Charles J. Call, Albuquerque, NM (US); Michael McLoughlin, Sykesville, MD (US); Dapeng Chen, Sykesville, MD (US); Scott Ecelberger, Sykseville, MD (US); Nathaniel K. Jones, Albuquerque, NM (US); Steven Strohl, Albuquerque, NM (US); Gary Anderson, Austin, TX (US)

(73) Assignee: Zeteo Tech, Inc., Sykesville, MD (US)

( * ) Notice: Subject to any disclaimer, the term of this patent is extended or adjusted under 35 U.S.C. 154(b) by 0 days.

(21) Appl. No.: 17/762,081

(22) PCT Filed: Aug. 26, 2020

(86) PCT No.: PCT/US2020/048042
§ 371 (c)(1),
(2) Date: Mar. 20, 2022

(87) PCT Pub. No.: WO2021/061330
PCT Pub. Date: Apr. 1, 2021

(65) Prior Publication Data
US 2023/0039261 A1  Feb. 9, 2023

Related U.S. Application Data

(60) Provisional application No. 63/069,705, filed on Aug. 24, 2020, provisional application No. 62/931,200, filed on Nov. 5, 2019, provisional application No. 62/904,655, filed on Sep. 23, 2019.

(51) Int. Cl.
*H01J 49/16* (2006.01)
*H01J 49/04* (2006.01)
(Continued)

(52) U.S. Cl.
CPC .......... *H01J 49/164* (2013.01); *G01N 1/2273* (2013.01); *G01N 15/10* (2013.01);
(Continued)

(58) Field of Classification Search
CPC ...... H01J 49/164; H01J 49/0418; H01J 49/40; G01N 1/2273; G01N 15/10; G01N 27/628;
(Continued)

(56) References Cited

U.S. PATENT DOCUMENTS 5,989,824 A    11/1999  Birmingham et al.
6,062,392 A    5/2000   Birmingham et al.
(Continued)

FOREIGN PATENT DOCUMENTS

EP      3508842       7/2019
WO      2021041571    3/2021
(Continued)

OTHER PUBLICATIONS

International Preliminary Report on Patentability for PCT/US2020/048042, issued by IPEA/KIPO dated Jan. 4, 2022 (with annex).

*Primary Examiner* — Nicole M Ippolito
*Assistant Examiner* — Hanway Chang
(74) *Attorney, Agent, or Firm* — Paradice & Li LLP; Anand S. Chellappa

(57) ABSTRACT

Disclosed are systems and methods to provide rapid and autonomous detection of analyte particles in gas and liquid samples. Disclosed are methods and devices for identifying biological aerosol analytes using MALDI-MS and chemical aerosol analytes using LDI and MALDI-MS using time-of-flight mass spectrometry (TOFMS).

36 Claims, 16 Drawing Sheets

(51) Int. Cl.
    *H01J 49/40*         (2006.01)
    *G01N 15/10*         (2006.01)
    *G01N 35/04*         (2006.01)
    *G01N 1/22*          (2006.01)
    *G01N 27/626*       (2021.01)
    *G01N 35/10*         (2006.01)
    *G01N 15/00*         (2006.01)

(52) U.S. Cl.
    CPC ........... *G01N 27/628* (2013.01); *G01N 35/04* (2013.01); *H01J 49/0418* (2013.01); *H01J 49/40* (2013.01); *G01N 2015/0038* (2013.01); *G01N 2015/0046* (2013.01); *G01N 2035/0475* (2013.01); *G01N 2035/1034* (2013.01)

(58) Field of Classification Search
    CPC ........... G01N 35/04; G01N 2015/0038; G01N 2015/0046; G01N 2035/0475; G01N 2035/1034
    See application file for complete search history.

(56) References Cited

U.S. PATENT DOCUMENTS

| | | | |
|---|---|---|---|
| 6,267,016 B1 | 7/2001 | Call et al. |
| 6,290,065 B1 | 9/2001 | Kenning et al. |
| 6,363,800 B1 | 4/2002 | Call et al. |
| 6,695,146 B2 | 2/2004 | Call et al. |
| 6,712,881 B2 | 3/2004 | Hering et al. |
| 6,729,196 B2 | 5/2004 | Moler et al. |
| 6,841,773 B2 | 1/2005 | McLoughlin et al. |
| 6,887,710 B2 | 5/2005 | Call et al. |
| 6,938,777 B2 | 9/2005 | Call et al. |
| 6,951,147 B2 | 10/2005 | Call et al. |
| 7,125,437 B2 | 10/2006 | Bryden et al. |
| 7,736,421 B2 | 6/2010 | Hering et al. |
| 7,759,123 B2 | 7/2010 | Call et al. |
| 7,799,567 B1 | 9/2010 | Call |
| 8,441,632 B2 | 5/2013 | Bartko |
| 9,610,531 B2 | 4/2017 | Hering et al. |
| 9,821,263 B2 | 11/2017 | Hering et al. |
| 2002/0146832 A1 | 10/2002 | Michel et al. |
| 2003/0020011 A1 | 1/2003 | Anderson et al. |
| 2005/0017102 A1 | 1/2005 | Shekarriz et al. |
| 2005/0035285 A1 | 2/2005 | Tan et al. |
| 2006/0257287 A1 | 11/2006 | Call et al. |
| 2009/0317916 A1 | 12/2009 | Ewing et al. |
| 2012/0018628 A1 | 1/2012 | Wuijckhuijse |
| 2012/0132799 A1 | 5/2012 | Takahashi et al. |
| 2016/0254133 A1 | 9/2016 | Lopez-Avila et al. |
| 2019/0025165 A1 | 1/2019 | Oberreit et al. |

FOREIGN PATENT DOCUMENTS

| | | |
|---|---|---|
| WO | 2021061247 | 4/2021 |
| WO | 2021201905 | 10/2021 |

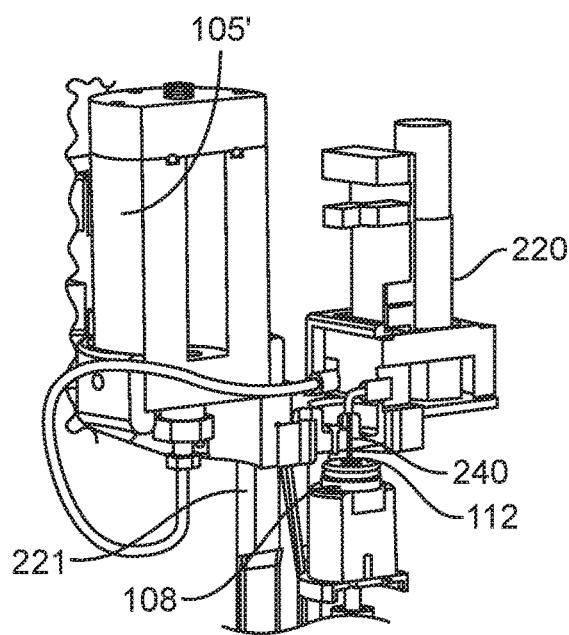
FIG. 10A
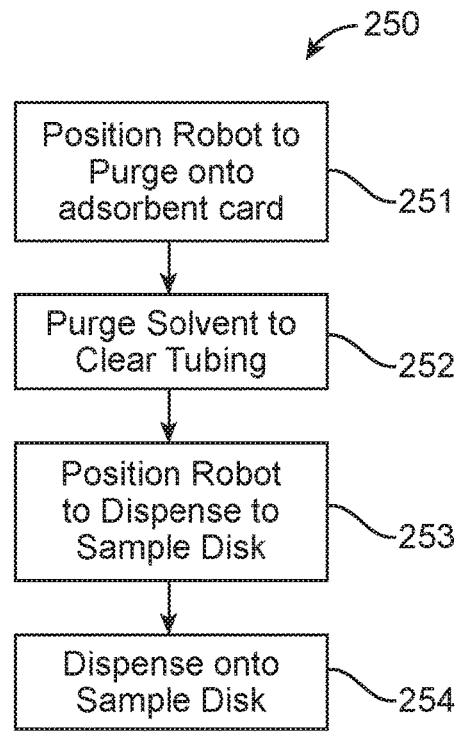
FIG. 10B
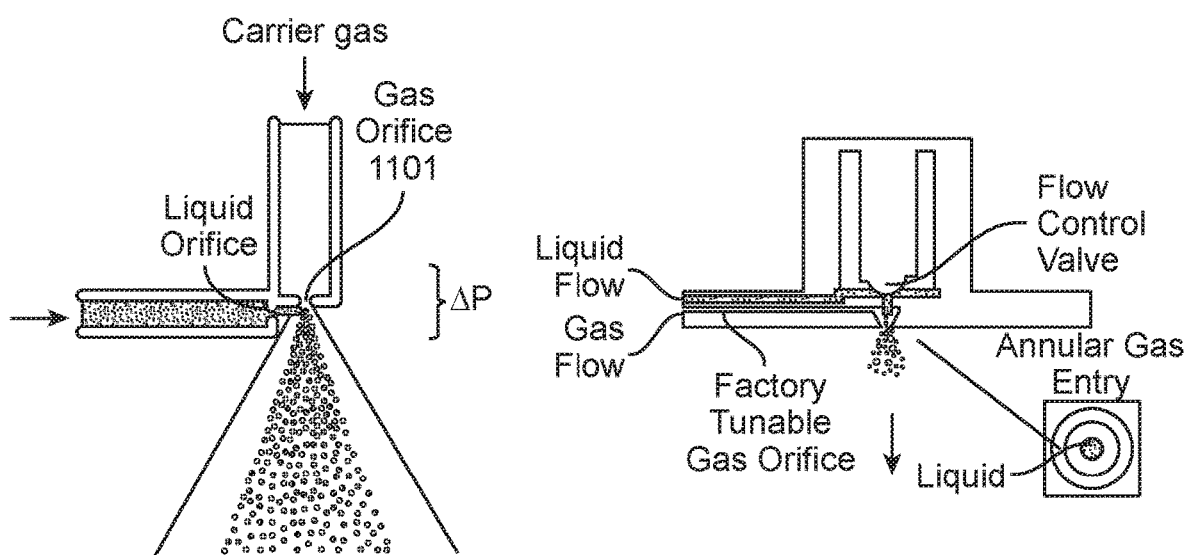
FIG. 11A
FIG. 11B

SYSTEMS AND METHODS OF RAPID AND AUTONOMOUS DETECTION OF AEROSOL PARTICLES

RELATED APPLICATIONS

This application is a U.S. National Stage Application of International Application No. PCT/US2020/048042, filed Aug. 26, 2020, which is related to and claims the benefit of U.S. Provisional Application 62/904,655, filed Sep. 23, 2019, and entitled "Systems and Methods of Rapid and Autonomous Detection of Aerosol Particles," U.S. Provisional Application 62/931,200, filed Nov. 5, 2019, and titled "Systems and Methods of Rapid and Autonomous Detection of Aerosol Particles," and U.S. Provisional Application 63/069,705, filed Aug. 24, 2020, and entitled "Systems and Methods of Rapid and Autonomous Detection of Aerosol Particles," the entire disclosures of which are hereby incorporated herein by reference in their entireties.

FIELD

This disclosure relates to systems and methods that use mass spectrometry and optionally one or more optical techniques to provide high accuracy, rapid and autonomous identification of aerosol analyte particles. More particularly, but not by way of limitation, the present disclosure relates to methods and devices for identifying biological aerosol analytes using MALDI-MS and chemical aerosol analytes using LDI-MS using time-of-flight mass spectrometry (TOFMS).

BACKGROUND

The threat from aerosolized biological and chemical threat agents remains a key concern of the U.S. Government because of the potentially dire consequences to life and property that may result from such an event. Two prime threat scenarios of particular concern are: (1) release of an agent inside an enclosed structure (e.g., office building, airport, mass transit facility) where HVAC systems could effectively distribute the agents through the entire structure and, (2) wide area release of an agent across an inhabited area such as a town or city. Exposure to the released aerosolized agent could lead to mass casualties. In a wide area release, it is extremely difficult to protect citizens from the initial exposure without timely information about the type of contaminant, quantity, and location of the contaminant. Methods and devices to identify the composition of the threat agents in real time and preferably autonomously, are required to take quick remedial action.

The threat posed by naturally occurring pandemics caused by microbes such a drug-resistant *Mycobacterium tuberculosis* and SARS-CoV-19 is, unfortunately, widely recognized. These organisms can be spread by contact or through aerosols emitted during normal breathing, coughing, sneezing, yawning, exercise, playing musical instruments, etc. Deep breathing in known to generate fine aerosol originating deep in the lungs, and when a respiratory infection is present, some of the particles in the aerosol will contain infectious microbes.

To be most effective in protecting infrastructure such as a major airport, an autonomous aerosol threat identifier should collect and analyze a sample and determine if the aerosol is hazardous in less than about five minutes. If aerosol threats can be identified in in less than about five minutes, remedial actions can be taken to limit the spread of aerosol within a building such as an airport terminal building. As more time lapses, the aerosol is spread by the movement of people and, more significantly, by the normal functioning of a building's ventilation system. In tall buildings, elevators can also move aerosol throughout the building in a matter of minutes. There is a need for an autonomous system that is able to detect toxic or pathogenic aerosol threat and to communicate with the building management system to limit the spread of the hazardous aerosols if they are disseminated in a building. Such a dissemination or "release" of a toxic or pathogenic aerosol is generally considered to be a "terrorist event."

Systems to sample, detect and identify a range of aerosol analytes, such as chemical and biological agents, are available but do not permit real-time or near real-time analysis or are limited to a small range of analytes. One solution employs microfluidic techniques to clean-up the sample and concentrate a biological analyte. For example, specific antibodies may be employed to concentrate and purify a biological analyte. This target-specific solution provides reasonable results if sufficient time is allowed for clean-up and concentration of the analyte. Another target-specific solution amplifies sections of nucleic acids that are uniquely associated with specific targets in the genome of a pathogen. Another solution is target specific and works only for bacterial analytes at the expense of analyzing viruses, toxins, or particulate chemicals. This method requires a sample, for example from a patient, to be applied to a bacterial culture plate and incubated for 8 to 24 hours. After the bacterial colonies have grown, individual amplified and purified colonies are collected and measured by whole cell "matrix assisted" laser desorption ionization (MALDI) time-of-flight (TOF) mass spectrometry. Numerous studies have examined the accuracy of this technique and have found >99% accurate identification for clinical bacterial analytes. Two commercial systems for rapid clinical bacterial identification have been developed, namely, the Bruker Biotyper (marketed by Becton Dickinson) and the Vitek MS (developed by Shimadzu and marketed by bioMérieux). These systems provide excellent diagnostic results relative to the 16 s RNA "laboratory gold standard" for bacteriological identification. However, to achieve these high-confidence clinical results, either a culturing or an extraction step, or both is needed to purify the sample. Therefore, the time from sampling to identification of the bio analyte is generally twelve hours to a day or more. While such delays are often tolerable in clinical laboratories, they are unacceptable for other applications such as biodefense, where near real-time identification of bio analytes is needed. Biodefense, and environmental bioaerosol monitoring more generally, as well as point-of-care healthcare applications, requires the ability to simultaneously identify in near real-time not only bacteria, but also fungi, viruses and large bioorganic molecules (e.g. proteins, peptides and lipids) including biotoxins. Further, decreasing analysis time for clinical applications could improve quality of care and outcomes by enabling timely treatment and identification of the best course of treatment (for example distinguishing between viral and bacterial infection) and evaluation of the effectiveness of the course of treatment. The above techniques have limitations related to analysis time to cost associated with developing the target specific reagents required to perform the analysis.

U.S. Pat. No. 8,441,632 titled "BIOLOGICAL AND CHEMICAL MICROSCOPIC TARGETING" discloses a technique that is potentially both sensitive, specific and rapid (approximately five minutes or less), but does not employ target-specific reagents, and is based on RAMAN spectroscopy. Raman spectroscopy is an analysis technique used to determine vibrational modes of molecules, although rotational and other low-frequency modes may also be observed. It is based upon the interaction of light with the chemical bonds within a material. RAMAN spectroscopy when applied to microbial samples does not sufficiently resolve near neighbors in a genus or species where some members of the group are pathogenic to humans and some are not.

In MALDI-TOFMS, the target particle (analyte) is coated by or mixed with a matrix chemical. The sample mixture is then allowed to dry prior to loaded into the mass spectrometer. The matrix chemical preferentially absorbs light (often ultraviolet wavelengths) from a short, intense laser pulse. In the absence of the matrix, the biological molecules would have a propensity to decompose by pyrolysis when exposed to intense ultraviolet light. In the presence of the matrix, the laser energy is preferentially absorbed by the matrix chemical, causing the matrix and the analyte to be vaporized. The matrix chemical also transfers charge to the vaporized molecules, creating ions that are then accelerated down a flight tube by the electric field. The coated analyte particles, which are often intact microbes are then analyzed using MALDI Time of Flight (TOF) mass spectrometry (MS). During sample preparation, a liquid, usually comprised of an acid, such as tri-fluoro-acetic acid (TFA), and a MALDI matrix chemical such as alpha-cyano-4-hydroxycinnamic acid, is dissolved in a solvent and added to the analyte. Solvents include acetonitrile, water, methanol, ethanol, and acetone. TFA is normally added to suppress the influence of salt impurities on the mass spectrum of the analyte and to leach acid-soluble proteins from within the analyte. The acid partially degrades the cell membrane of the analyte making the proteins available for ionization and analysis in a TOF mass spectrometer. Water enables hydrophilic proteins to dissolve, and methanol enables at least some hydrophobic proteins to dissolve. The MALDI matrix solution is spotted on to the analyte on a MALDI plate to yield a uniform homogenous layer of MALDI matrix material on the analyte. The solvents vaporize, leaving only the recrystallized matrix with the analyte spread through the matrix crystals. The coated plate containing the analyte mixed with acid and matrix is then analyzed in a TOF mass spectrometer. Other MALDI matrix materials include 3,5-dimethoxy-4-hydroxycinnamic acid (sinapinic acid), α-cyano-4-hydroxycinnamic acid (α-cyano or α-matrix) and 2,5-dihydroxybenzoic acid (DHB) as described in U.S. Pat. No. 8,409,870. The MALDI technique coupled with high-mass-range time-of-flight (TOF) mass spectrometry may also permit direct analysis of large peptide components, and complete proteins enabling "whole cell" biological identification.

U.S. Pat. Pub. No. 2003/0020011 titled "SAMPLE COLLECTION PREPARATION METHODS FOR TIME-OF FLIGHT MINIATURE MASS SPECTROMETER," discloses a method and device for collecting ambient aerosols such as biological hazards and identifying the composition of the aerosol particles. A MALDI matrix chemical is nebulized and injected into an ambient sample aerosol. The matrix aerosol particles and sample aerosol particles are co-deposited on medium such as a VCR (video cassette recorder) tape. The tape is then moved into a MALDI time-of-flight mass spectrometer for analysis. The matrix particle and ambient aerosol particle interactions occur on the tape because and the particles do not collide with each other prior to deposition on the tape. Collision of matrix and sample aerosol particles on the tape surface is enabled by a nozzle that accelerates the particles to high velocities and directs the aerosol flow at the tape. Because of the energy expended to accelerate the flow, the particles impact the surface, and coincidently with each other, on the tape. Without this acceleration, the particles would flow past the tape following the streamlines of gas phase flow. U.S. Pat. No. 6,841,773 titled "PORTABLE TIME OF FLIGHT MASS SPECTROMETER SYSTEM" discloses a field portable mass spectrometer system comprising a sample collector and a sample transporter in the form of a video cassette tape. The sample transporter interfaces with the sample collector to receive sample deposits thereon. The system comprises a time of flight (TOF) mass spectrometer.

U.S. Pat. Pub. No. 2005/0017102 titled "ELECTROSTATIC ATOMIZER AND METHOD OF PRODUCING ATOMIZED FLUID SPRAYS," discloses contacting an analyte sample stream with one or more spray fluids contained in separate reservoirs comprising a MALDI matrix, depositing the analyte on a substrate such as a MALDI plate and analyzing using MALDI MS. In one example, a first microinjector is fed with isopropanol. A second injector is fed with a mixture of 70% acetonitrile, 30% water and a third injector 0.1% trifluoroacetic acid. A third injector is fed sequentially with various process fluids, including water, water/glycerine, acetic acid, formic acid and ethanol. The controlled microinjectors (e.g., 100 μm ID stainless steel needle operably connected to a power source) spray the atomized liquids into a sample preparation zone. The injectors are oriented such that each sprays into the same region of the sample preparation zone. The sample preparation zone is a channel, perpendicular to the orientation of the microinjectors. A concentrated gas stream containing the sample to be analyzed such as bacteria spores or other biological materials, is passed through the sample preparation zone, contacted with the sprayed fluids, and then directed onto a sample slide for MALDI analysis. However, mixing a MALDI matrix aerosol stream with an analyte aerosol stream, as disclosed will not cause the individual particles within the two aerosol streams to collide with each other in the absence of some additional external force such as acoustic or electrostatic force is applied to drive such particle collisions.

U.S. Pat. No. 7,125,437 titled "METHOD AND APPARATUS FOR ENHANCED PARTICLE COLLECTION EFFICIENCY," discloses a method for particle collection comprising the steps of guiding an air stream containing particles to be collected and analyzed toward an impaction surface and introducing an aerosol containing aqueous droplets into the air stream upstream from the impaction surface to coagulate the particles with the aqueous droplets and to increase a size of the particles enhancing a collection efficiency of the coagulated particles on the impaction surface. The aerosol containing the aqueous droplets may be produced by directing a pressurized stream of carrier gas against a reservoir containing a liquid, thereby aspirating the liquid out of the reservoir while shearing liquid particulates apart to aerosolize the aspirated liquid before co-aerosolizing the particles in the air stream. Alternately, the aerosol containing the aqueous droplets may be produced by driving a selected liquid through a piezo-electric based nebulizer comprising a piezo-electric element and vibrating the piezoelectric element at a desired frequency sufficient to shear apart liquid particulates to generate the aerosol as the liquid particulates traverse an outlet of the piezo-electric based element. The disclosed method may further comprise the steps of wetting the impaction surface as the coagulated particles impinge against the impaction surface to form a pool of liquid on the impaction surface to minimize bouncing of the coagulated particle off the impaction surface to enhance the collection efficiency, and selecting additives and co-aerosolizing the selected additives to create an environment in the air stream or in the pool of liquid on the impaction surface to mechanically, chemically or biologically modify the coagulated particles to enhance identification of the collected coagulated particles. The additives are selected that the environment created in the air stream or in the pool of liquid allows accelerated growth of organisms to be cultured. Formation of the pool of standing liquid droplets can also be realized by introducing a metered volume of liquid directly in the vicinity of the impaction surface, for example, at the base of an impaction nozzle. As a result, instead of introducing excessive droplets upstream from the impaction surface, the pool of standing droplets can be created right on this surface. The methods and apparatus disclosed in U.S. Pat. Nos. 7,125,437 and 6,841,773 do not result in a reliable aerosol sampling and matrix mixing apparatus for MALDI-MS analysis because aerosolizing the MALDI matrix using the methods described tends to crystallize a fraction of the matrix chemical and clog the nebulizer.

Methods and devices for providing reliable, autonomous and near real-time analysis and identification of aerosol analyte particles including bacteria, fungi, viruses, toxins and low-volatility chemicals such as aerosols comprised of one or more compounds with molecular weight below about 1000 Da, with high accuracy, are desired.

BRIEF DISCLOSURE

Disclosed is an autonomous sample capture and analysis system comprising a fresh sample disk or substrate loader station configured to receive a cartridge having a stack of fresh disks, a spent sample disk or substrate loader station configured to receive a spent disk cartridge, a sample collection station, and an analysis station comprising a TOFMS wherein a sample disk holder is configured to move horizontally and vertically using at least one of a stepper motor and actuator and couple with each station using a predetermined analysis sequence and wherein the operation of the system is controlled using a microcontroller. The sample collection station may comprise at least one of an aerosol sample collection station and a liquid sample acceptance station. The exemplary system may further comprise a camera station. The exemplary system may further comprise a liquid chemical dispensing station. The sample disks may be pre-coated with a MALDI matrix chemical. The sample disks may be made of at least one of nickel and nickel alloys. The aerosol sample collection station may be configured to produce a sample spot size of about 1 mm in diameter. The dispensing station may be configured to dispense between about 0.5 µl and about 2 µl of a liquid. The dispensed liquid may comprise at least one of TFA, acetonitrile, methanol, ethanol, and water. The system may be configured to communicate with a remote server using at least one of wired communication and wireless communication wherein the output of the analysis station is transferred to the remote server and then to a data processing station. The system may be configured to communicate with a data processing station using at least one of wired communication and wireless communication wherein the output of the analysis station is transferred to the data processing station for processing.

Disclosed is an autonomous sample capture and analysis system comprising a fresh sample disk or substrate loader station configured to receive a cartridge having a stack of fresh disks, a spent sample disk or substrate loader station configured to receive a spent disk cartridge, an aerosol sample collection station, a liquid chemical dispensing station, a camera station, and an analysis station wherein a sample disk holder is configured to move horizontally and vertically using at least one of a stepper motor and actuator and couple with each station using a predetermined analysis sequence and wherein the operation of the system is controlled using a microcontroller. The robotic system disclosed herein has two axes of movement. Other embodiments with three axes of movement are possible but may not be as reliable as those with two axes of movement. The analysis station may comprise a TOFMS. The analysis station may comprise at least one of a TOFMS and an optical detector. The camera station may be configured to receive at least one of a microscope camera and a digital camera. The system may further comprise a drying station wherein the sample is substantially dried using at least one of inductive heating, resistive heating, flow of dry air, flow of hot air, and vacuum and combinations thereof. The exemplary system may further comprise a fluorescence sensor disposed upstream of the sample collection station to measure at least one of particle size distribution, particle count, and target analyte particle to clutter particle ratio.

Disclosed is a method for collecting and analyzing aerosol analyte particles using an exemplary system disclosed herein, the method comprising loading a sample disk onto to the sample disk holder at the fresh sample disk loader station, moving the sample disk holder having a fresh disk to the aerosol collection station wherein aerosol particles are impacted onto the coated sample disk, moving the sample disk holder to the liquid chemical dispensing station for treating the deposited aerosol sample with chemicals, moving the sample disk holder to the camera station for examination using at least one of a microscope camera and imaging using a digital camera, drying the sample, and, moving the sample disk holder to TOFMS analysis station for sample analysis. The method may further comprise the steps of transferring the output of the TOFMS analysis station to a remote server using at least one of the wired communication and wireless communication between the autonomous sample capture and analysis system and the server, generating raw spectral data unique to the aerosol analyte particles, performing at least one of filtering, baseline subtraction, signal to noise ratio estimation, peak detection, and feature extraction to generate processed spectral data, and, identifying the composition of the aerosol analyte particle by comparing the processed spectral data with a reference library comprising processed spectral data of several biological and chemical analytes. The sample disk may be pre-coated with a MALDI matrix chemical. The aerosol sampler may be configured to receive a sample of ambient aerosol or an aerosol suspended in a process fluid, such as from a semiconductor process fluid. If the process fluid is a liquid, then the process fluid would be aerosolized prior to being received by the aerosol sampler.

Disclosed is an autonomous analysis system, the system comprising a fresh sample disk or substrate loader station configured to receive a cartridge having a stack of fresh disks, a spent sample disk or substrate loader station configured to receive a spent disk cartridge, a liquid sample acceptance station, a liquid chemical dispensing station and a TOFMS analysis station wherein a sample disk holder is configured to move horizontally and vertically using at least one of a stepper motor and actuator and couple with each station using predetermined analysis sequence and wherein the operation of the system is controlled using a microcontroller. The liquid sample acceptance station may be configured to receive a liquid sample from an aerosol collection device. The liquid sample acceptance station may be configured to receive a liquid sample comprising exhaled breath. The liquid sample acceptance station may be configured to receive a liquid sample obtained from a liquid sample processing device capable of purifying target analytes. The aerosol collection device may comprise at least one of an impactor, a rotating impactor with continuous or intermittent rinsing, a cyclone with continuous or intermittent rinsing, a wet-walled impactor, and a liquid impinger.

Disclosed is an exemplary method for collecting and analyzing aerosol particles, the method comprising collecting aerosol particles into a liquid, subjecting the liquid sample to at least one of enzyme and hot acid treatment and generating peptides characteristic of the aerosol sample, adding MALDI matrix solution to the treated sample, and drying and analyzing the sample using TOFMS. The at least one of enzyme and hot acid treatment step is done at about 140° C. for about 15 min.

Disclosed is an autonomous sample for capturing and analyzing contaminant particles in a liquid sample comprising a nebulizer to produce an aerosol comprising contaminant particles in a carrier gas, at least one condensation growth tube to enlarge the size of the contaminant particles in the aerosol to a predetermined average particle diameter, a fresh sample disk or substrate loader station configured to receive a cartridge having a stack of fresh disks, a spent sample disk or substrate loader station configured to receive a spent disk cartridge, an aerosol sample collection station, a liquid chemical dispensing station, and an analysis station wherein a sample holder is configured to move horizontally and vertically using at least one of a stepper motor and actuator and couple with each station using a predetermined analysis sequence and wherein the operation of the system is controlled using a microcontroller. The analysis station comprises an LDI-MS. The analysis station may comprise at least one of a LDI-MS and an optical detector. Alternately, the analysis station may comprise a MALDI-TOFMS, in which case, the disks are pre-coated with a MALDI matrix chemical. The sample disk may be made of at least one of nickel and nickel alloys. Other materials may be preferable for specific applications. For example, silicon, germanium, or a rare earth metal may be preferable for trace metal analysis of semiconductor impurities. If an non-magnetic disk material is used, a thin film of a magnetic material must be disposed on the bottom of sample disk. The dispensing station may be configured to dispense between about 0.5 µL and about 2 µL of a liquid. The dispensed liquid may comprise at least one of TFA, acetonitrile, methanol, ethanol, and water. The system may further comprise a camera station. The camera station may be configured to receive at least one of a microscope camera and a digital camera. The system may further comprise a drying station wherein the sample is substantially dried under vacuum. The system may further comprise a fluorescence sensor disposed upstream of the sample collection station to measure at least one of particle size distribution, particle count, and target analyte particle to clutter particle ratio. The system may further comprise a data processing station for acquiring and processing data output from the analysis station to identify the composition of the contaminant particles. The average size of the contaminant particles may be between about 1 nm and about 20 nm. The average size of the particles exiting the condensation growth tube may be between 1 µm and 10 µm. Alternately, the average size of the particles exiting the condensation growth tube may be between about 2 µm and about 4 µm. The average size of the particles exiting the condensation growth tube may be about 3 µm. The liquid sample may comprise at least one of UPW, and chemical liquids used during semiconductor fabrication.

Disclosed is an exemplary method for capturing and analyzing contaminant particles in a liquid sample, the method comprising providing an exemplary device disclosed herein, nebulizing the liquid sample to produce an aerosol comprising contaminant particles in a carrier gas, growing the size of the contaminant particles in the aerosol using at least one condensation growth tube to produce enlarged contaminant aerosol particles of predetermined average particle diameter, loading a sample disk onto to the sample holder at the fresh sample disk loader station, moving the sample holder having a fresh disk to the aerosol collection station wherein the enlarged contaminant aerosol particles are impacted onto the coated sample disk, moving the sample holder to the liquid chemical dispensing station for treating the deposited aerosol sample with chemicals, moving the sample holder to the camera station for examination using at least one of a microscope camera and imaging using a digital camera, drying the sample, and moving the sample holder to an analysis station for sample analysis. The method may further comprise measuring at least one of particle size distribution, particle count, and target analyte particle to clutter particle ratio using a fluorescence sensor disposed upstream of the sample collection station. The analysis station may comprise a LDI-MS. The analysis system may comprise at least of one LDI-MS, MALDI-TOFMS, LIBS, Raman Spectroscopy, and IR spectroscopy. The method may further comprise the steps of generating raw spectral data unique to the aerosol analyte particles, performing at least one of filtering, baseline subtraction, signal to noise ratio estimation, peak detection, and feature extraction to generate processed spectral data and identifying the composition of the contaminant particles by comparing the processed spectral data with a reference library comprising processed spectral data of several biological and chemical analytes. The identifying steps may comprise using machine learning to compare spectral data with a training data set to predict contaminant particle composition.

Other features and advantages of the present disclosure will be set forth, in part, in the descriptions which follow and the accompanying drawings, wherein the preferred aspects of the present disclosure are described and shown, and in part, will become apparent to those skilled in the art upon examination of the following detailed description taken in conjunction with the accompanying drawings or may be learned by practice of the present disclosure. The advantages of the present disclosure may be realized and attained by means of the instrumentalities and combinations particularly pointed out in the appendant claims.

DRAWINGS

The foregoing aspects and many of the attendant advantages of this disclosure will become more readily appreciated as the same becomes better understood by reference to the following detailed description, when taken in conjunction with the accompanying drawings, wherein:

FIGS. 1A, 1B and 1C show a perspective view of an exemplary autonomous aerosol sample capture and analysis system, a perspective view of sample disk holder for use in the autonomous system and a cross sectional view of a sample collection station, respectively.

FIGS. 2A-2E show a perspective view of an exemplary cartridge for holding fresh sample disks, a perspective view of a stacks of sample disks in a cartridge, cross sectional view of a stack of disks in a cartridge prior to loading a sample disk in a sample disk holder, cross sectional view of a stack of disks in a cartridge after loading a sample disk in a sample disk holder, and a cross sectional view of a cartridge, respectively.

FIG. 3. Schematic diagram of an exemplary autonomous method for aerosol particle sample capture and analysis.

FIG. 4. Schematic diagram of an exemplary system resetting method related to autonomous method for aerosol particle sample capture and analysis.

FIG. 5. Raw mass spectra of biological aerosol particles obtained using an exemplary sample capture and analysis system.

FIG. 6. Processed mass spectrum (bottom) of Bg (*Bacillus subtilis* var *niger*) aerosol spores obtained using an exemplary sample capture and analysis system and compared with library Bg spectra (top).

FIG. 7. Processed mass spectrum (bottom) of Bt (*Bacillus thuringiensis* al Hakam) aerosol spores obtained using an exemplary sample capture and analysis system and compared with library Bt spectra (top).

FIG. 8. Processed mass spectrum of bioaerosol particles comprising Bg, Bt, Enterobacteria phage T2, *E. coli*, and protein albumin (66 kDa, Da=Dalton) over full mass range (top, up to about 80 kDa) and over low mass range (bottom, up to about 10 kDa).

FIG. 9. Sensitivity of analysis using exemplary autonomous aerosol sample capture and analysis system to varying concentrations of Bg particles in air comprising building dust and laboratory air.

FIGS. 10A and 10B show a perspective view of an exemplary solvent dispense pump and a flow schematic for solvent flow, respectively.

FIGS. 11A and 11B show schematic diagrams of exemplary nebulizers for use in an exemplary autonomous aerosol sample capture and analysis system.

Figure 14:
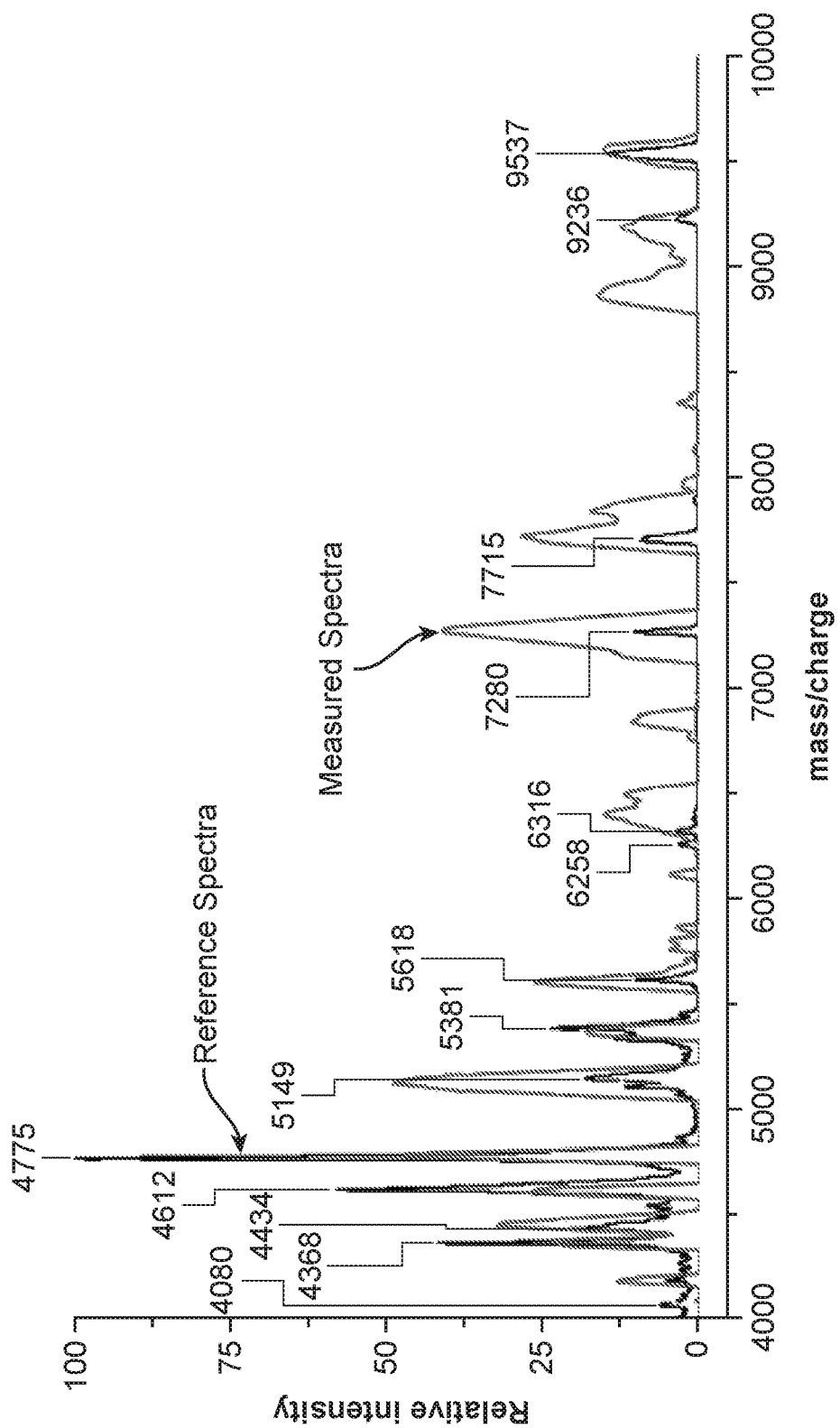

FIG. 14. Processed mass spectrum of bioaerosol particles comprising *E. coli* using an exemplary sample capture and analysis system.

Figure 15:
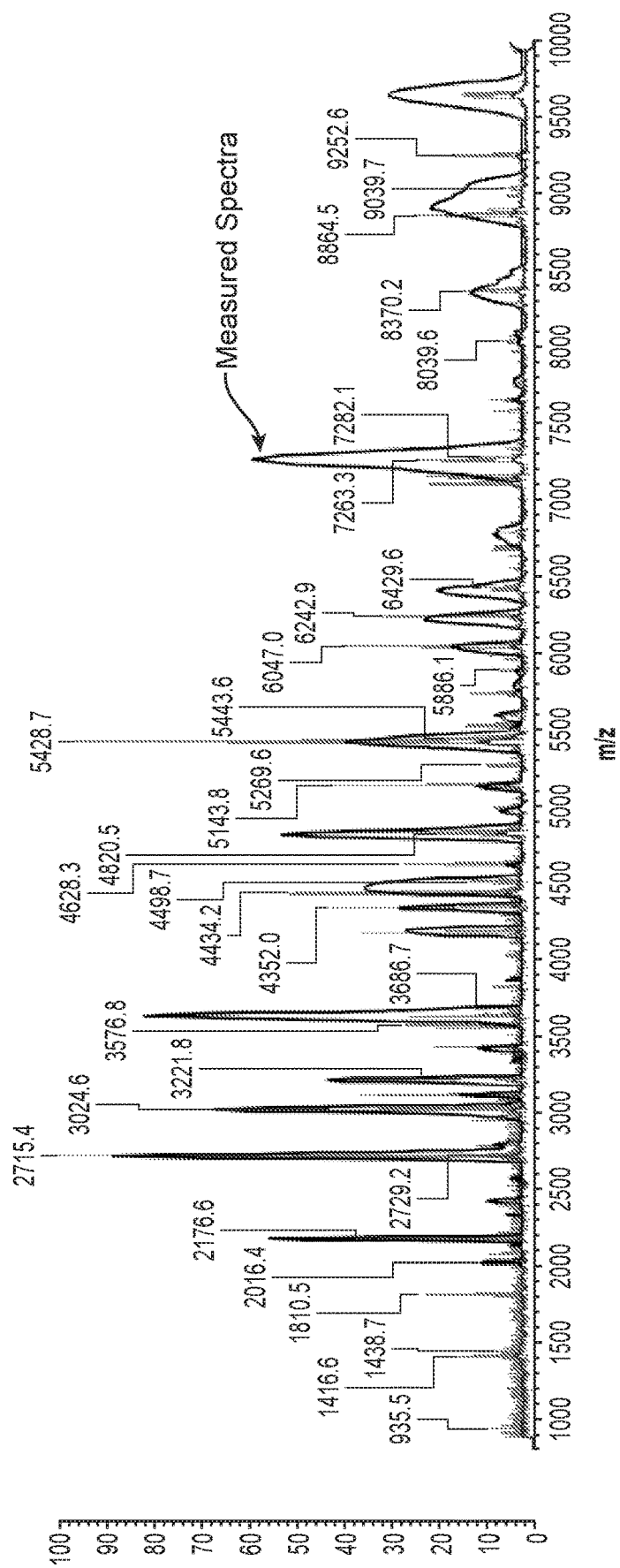

FIG. 15. Processed mass spectrum of bioaerosol particles comprising *Y. rohdei* using an exemplary sample capture and analysis system.

Figure 16:
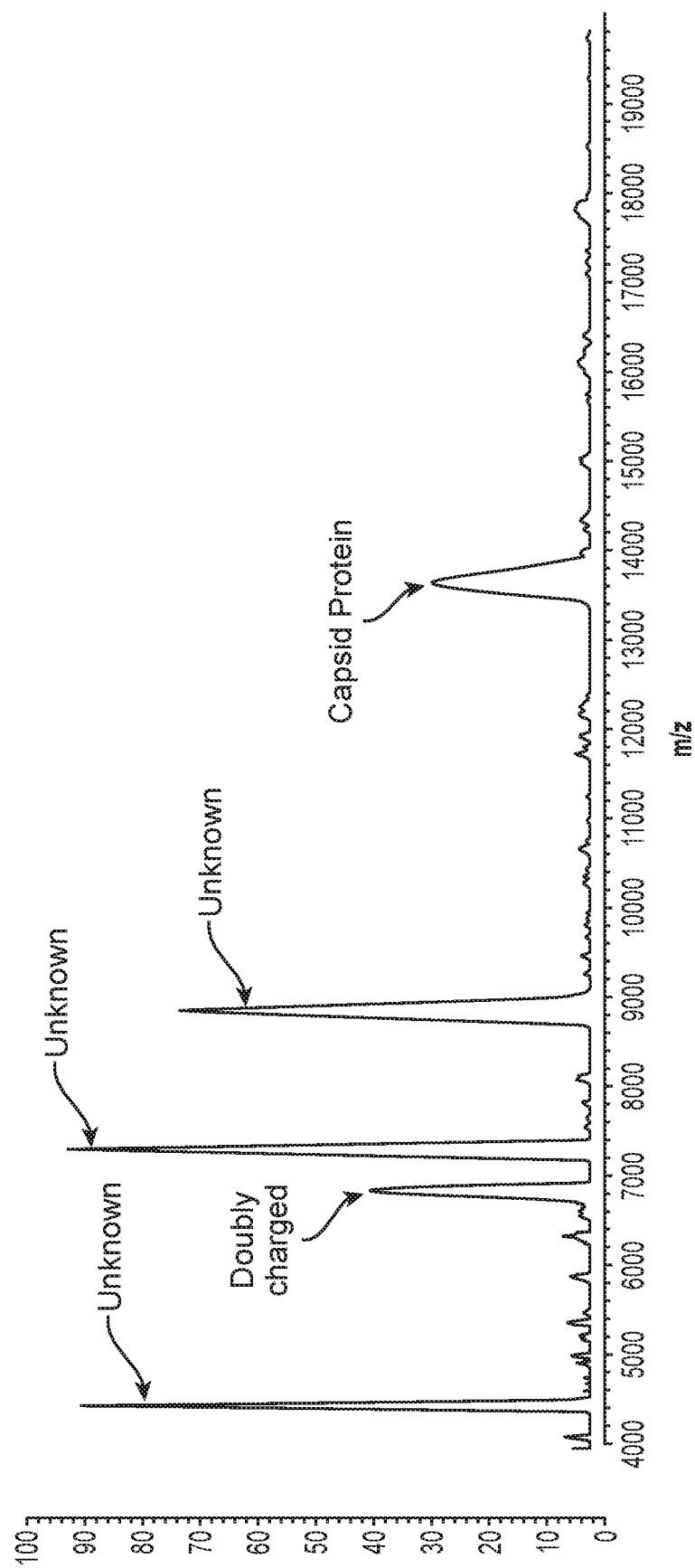

FIG. 16. Processed mass spectrum of bioaerosol particles comprising *E. coli* Bacteriophage MS2 virus using an exemplary sample capture and analysis system.

All reference numerals, designators and callouts in the figures are hereby incorporated by this reference as if fully set forth herein. The failure to number an element in a figure is not intended to waive any rights. Unnumbered references may also be identified by alpha characters in the figures and appendices.

The following detailed description includes references to the accompanying drawings, which form a part of the detailed description. The drawings show, by way of illustration, specific embodiments in which the disclosed systems and methods may be practiced. These embodiments, which are to be understood as "examples" or "options," are described in enough detail to enable those skilled in the art to practice the present invention. The embodiments may be combined, other embodiments may be utilized, or structural or logical changes may be made, without departing from the scope of the invention. The following detailed description is, therefore, not to be taken in a limiting sense and the scope of the invention is defined by the appended claims and their legal equivalents.

In this disclosure, aerosol generally means a suspension of particles dispersed in air or gas. "Autonomous" means "with no or minimal intervention by a professional technician or instrument operator." "Sample disk" or "sample substrate" means a solid (typically metal) surface upon which a sample may be deposited. "Real-time" or "near real-time" analysis of aerosols generally means analytical methods and devices that identify the aerosol analyte within a matter of several minutes (e.g., less than about five minutes) after the aerosol sample to be analyzed is collected. The terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation. Unless otherwise specified in this disclosure, for construing the scope of the term "about," the error bounds associated with the values (dimensions, operating conditions etc.) disclosed is ±10% of the values indicated in this disclosure. The error bounds associated with the values disclosed as percentages is ±1% of the percentages indicated. The word "substantially" used before a specific word includes the meanings "considerable in extent to that which is specified," and "largely but not wholly that which is specified."

DETAILED DISCLOSURE

Particular aspects of the invention are described below in considerable detail for the purpose for illustrating the compositions, and principles, and operations of the disclosed methods and systems. However, various modifications may be made, and the scope of the invention is not limited to the exemplary aspects described.

Figure 1A:
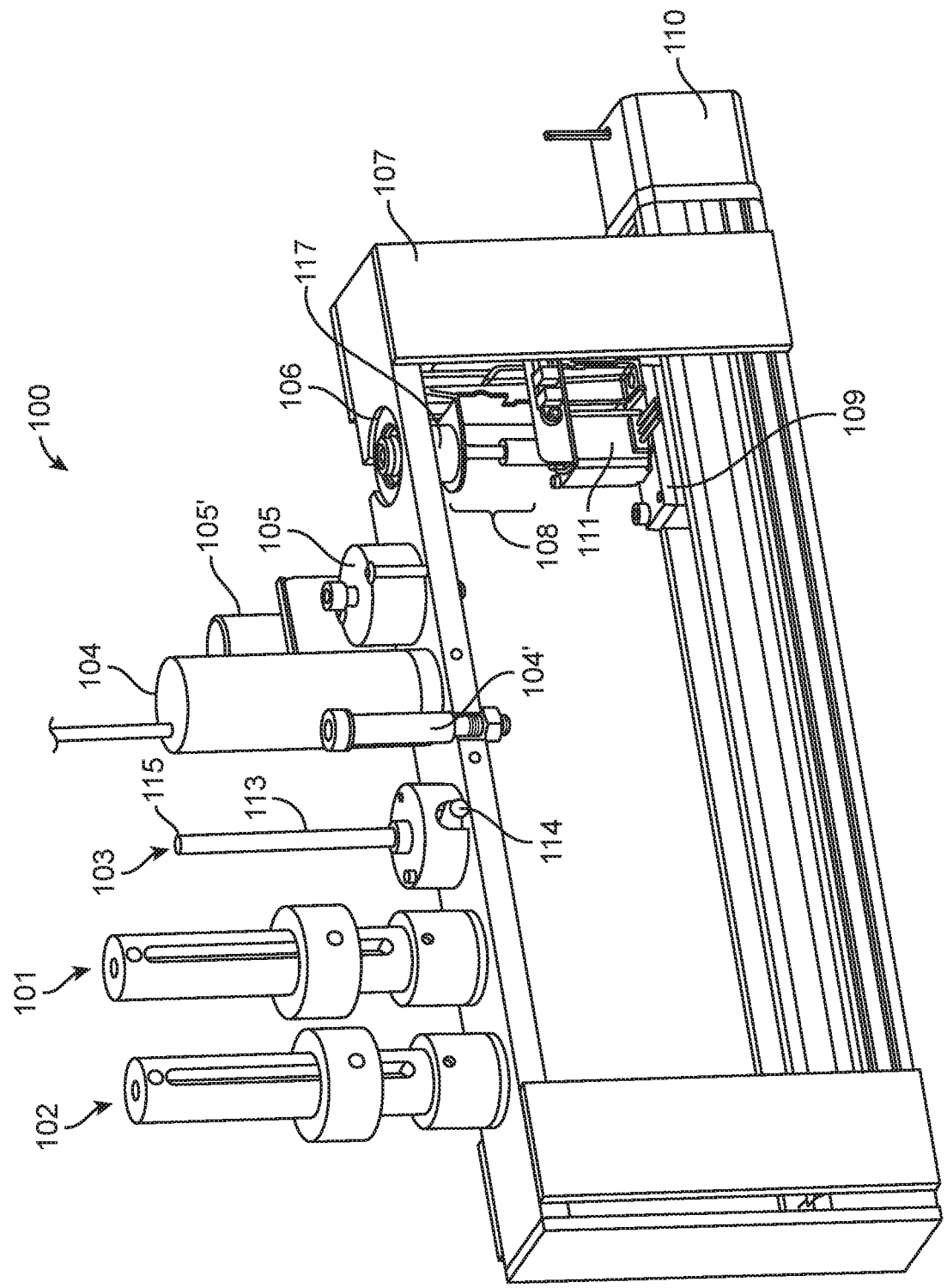

An exemplary autonomous sample capture and analysis system 100 (FIGS. 1A-B), may comprise a fresh sample disk or substrate loader station 101, a spent sample disk or substrate loader station 102, an aerosol sample collection station 103, a camera station 104, a liquid chemical dispensing station 105 and a TOFMS analysis station 106 disposed on a suitable frame 107. A sample disk holder 108 is disposed in frame 107 and is configured to be movably disposed under each station. Sample disk holder 108 is configured to move horizontally (X-Y axis) using linear actuator and stepper motor 110. Sample disk holder 108 may also be configured to move vertically (Z direction) using stepper motor and linear actuator 111. That is, sample disk holder 108 may be configured to autonomously (robotically) move between the stations (horizontal movement) and engage with each station using vertical movements. An exemplary disk 112 may be 6 mm in diameter and may be made of at least one of nickel and nickel alloys. The thickness of disk 112 may be between about 0.05 in. and about 0.01 in. Dispensing station 105 is configured to dispense between about 0.5 µL and about 1.5 µL of a liquid stored in reservoir 105' using a dispensing pump. Micro-dispensing pumps, for example, pumps supplied by The Lee Company (Westbrook, Conn.) may be used. Another exemplary dispensing pump is a peristaltic pump 220 (Insetek, Inc., Calif.) as shown in FIG. 10A. Pump 220 may be suitable for use with chemical-resistant tubing with internal diameter of 1 mm or less, and outer diameter of 1 mm or less. Sample loader 108, in addition to holding a sample disk 112, also holds and adsorbent card or pad. Adsorbent card 221 is disposed adjacent to the sample holder and is used to adsorb liquid dispensed when the tubing is purged. The adsorbent card is comprised of a woven or non-woven hydrophilic porous sheet of about 0.1-1 mm thickness. The card material may comprise at least one of a paper fiber, nylon, and polytetrafluoroethylene (PTFE) woven sheet. An exemplary chemical-resistant tubing type is C-FLEX tubing (Cole-Palmer Vernon Hills, Ill.).

The chemical liquid may comprise TFA, acetonitrile, methanol, ethanol, and water. The liquid may comprise about 70 vol.-% acetonitrile, about 15 vol.-% TFA, with the remaining being water. Alternately, the liquid may comprise about 70 vol.-% methanol, about 15 vol.-% TFA, with the remaining being water. The volume of liquid dispensed is between about 0.5 µl and about 2 µl to obtain a sample spot of about 1 mm diameter (with a nozzle 165 diameter of about 0.7 mm) on the sample disk. At higher ambient temperatures of greater than about 35° C., the dispensing volume may need to be higher to compensate for evaporation losses of the solvent. The dispensing volume and nozzle diameter may be varied to achieve a spot of between about 0.5 mm and about 1.5 mm in spot size. In order to remove this influence of ambient conditions, system 100 or a portion thereof may be disposed in a space with temperature and humidity control. Alternatively, temperature and humidity inside system 100 may be monitored, and the dispense volume controlled accordingly. Furthermore, the volume of liquid dispensed for an analysis may be scaled in proportion to the size of the analyte spot. Subsequently, a smaller spot will require less liquid to be dispensed. A preferred enclosure for system 100 is a sealed, temperature-controlled case. One or more desiccants or adsorbents loaded into a suitable adsorber component (not shown) may be provided within the case to remove water and solvent vapors to ensure that system 100 is warm and dry, and sample drying preferably occurs in a warm and dry ambient condition. In this context, "warm" means between about 30° C. and about 45° C. and "dry" means below about 25% relative humidity.

The dispense tube tip 240 comprises at least one of stainless steel and a solvent-resistant, acid-resistant polymer such at PTFE. FIG. 10B shows an exemplary sequence 250 for dispensing a bolus of solvent on sample disk 112. First, the sample adsorbent card 221 is positioned under the dispense tube in step 251. In step 252, pump 220 is activated for sufficient duration to completely purge any fluid disposed in the dispense tube downstream of pump 220. In step 253, sample disk holder 108 with disk 112 is position (which may be configured to robotically move between stations as previously described) under dispense tube tip 240, and in step 254, liquid is dispensed onto the sample disk 112. Pump speed and operation may be controlled by the system controller (not shown).

Disk 112 may be precoated with MALDI chemical comprising alpha-cyano-4-hydroxycinnamic acid dissolved in a solvent. Solvents may include acetonitrile, water, methanol, ethanol, and acetone. Optionally, system 100 may comprise a MALDI matrix coating station to coat disk 112. Fresh disk 112 may be coated prior to being loaded into a fresh sample disk cartridge 200; that is, prior to being loaded into the system 100. Alternately, MALDI matrix solution may be added from a reservoir to the sample after it has been deposited on a disk. The reservoir may need to be heated and stirred using a magnetic stirring to keep the matrix in solution.

Figure 1B:
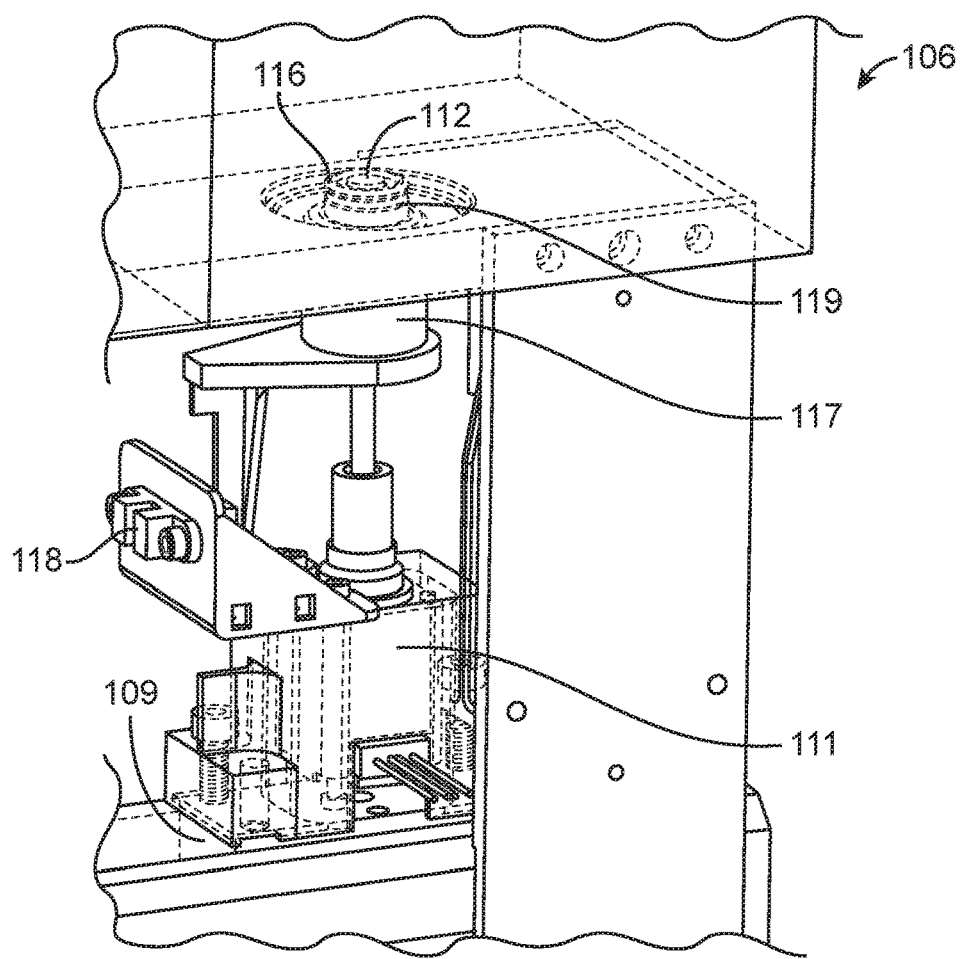
Figure 1C:
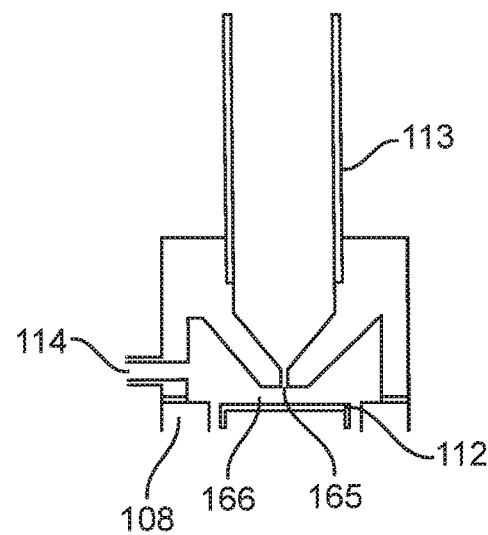

System 100 may also comprise a homing sensor to align the movable sample disk holder 108 with each station. Z-axis homing sensor 118 is shown in FIG. 1B. Stepper motors 110 (X-Y axis) and 111 (Z-axis) may be controlled using a microcontroller. Stepper motor 111 may be mounted on X-Y axis carriage 109. At station 106, stub 116 may be isolated from the TOFMS using electrical insulator element 117. Aerosol collection station 103 may comprise a ¼" O.D. SS 304 or SS 316 alloy tubing 113. A flexible tubing (not shown) may be removably connected to inlet tubing 113 at end 115 and positioned in the area to be sampled. For example, an ambient air sample may be drawn into inlet tubing 113 using an aerosol pump (not shown) that is connected to outlet tube or fitting 114 in station 103. In some applications, the flexible tubing may be connected to a ventilation duct to collect a sample of the air flowing in the duct. The end of inlet tubing 113 that is disposed opposite to end 115 may be configured to feed the aerosol to the impactor nozzle 165 as shown in FIG. 1C. Nozzle 165 may be characterized by a hole diameter at the nozzle tip 167 of between about 0.35 mm and about 1 mm. Spacing 166 disposed between the nozzle tip 167 and sample disk 112 may be about the size of the nozzle diameter; that is, between about 0.35 mm and about 1 mm.

Figure 2A:
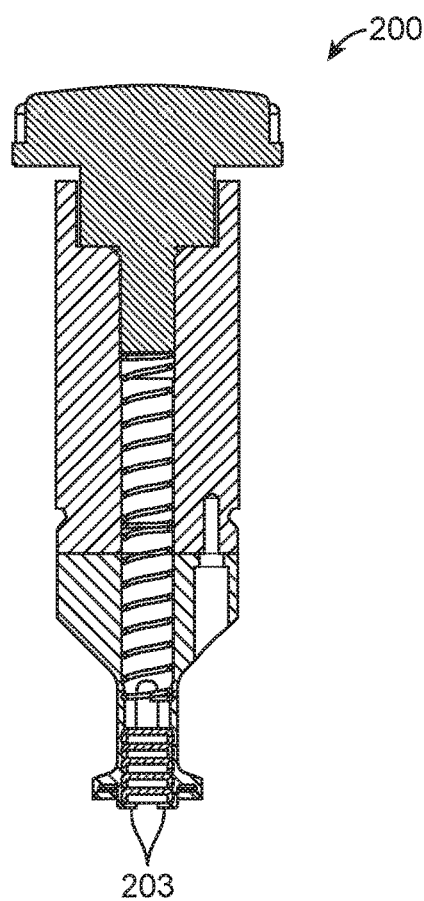
Figure 2B:
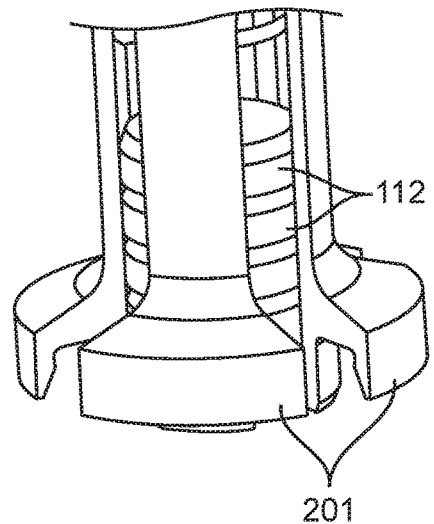
Figure 2C:
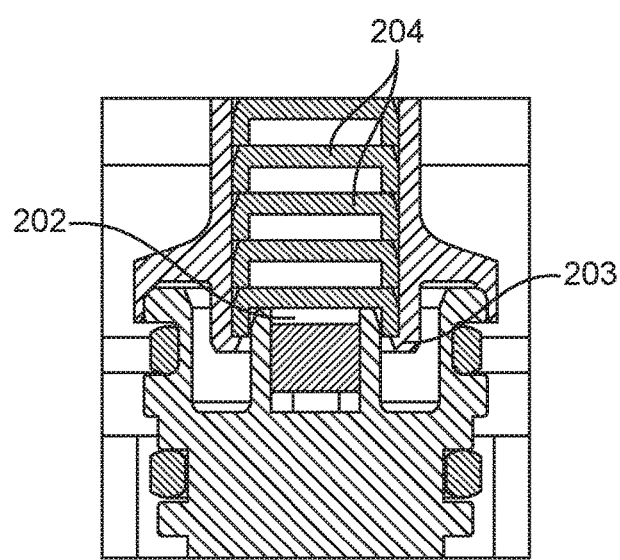
Figure 2D:
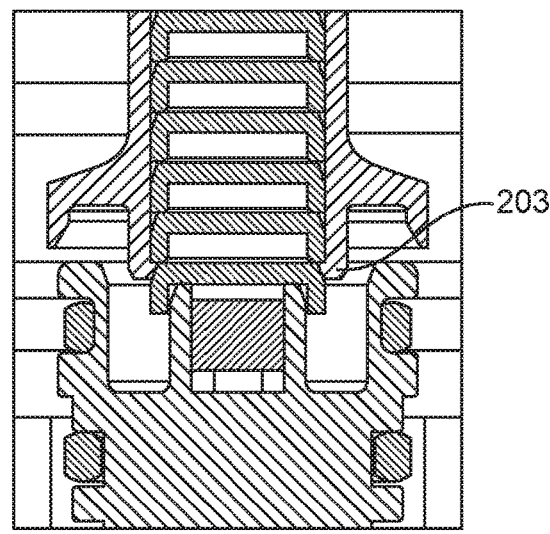
Figure 2E:
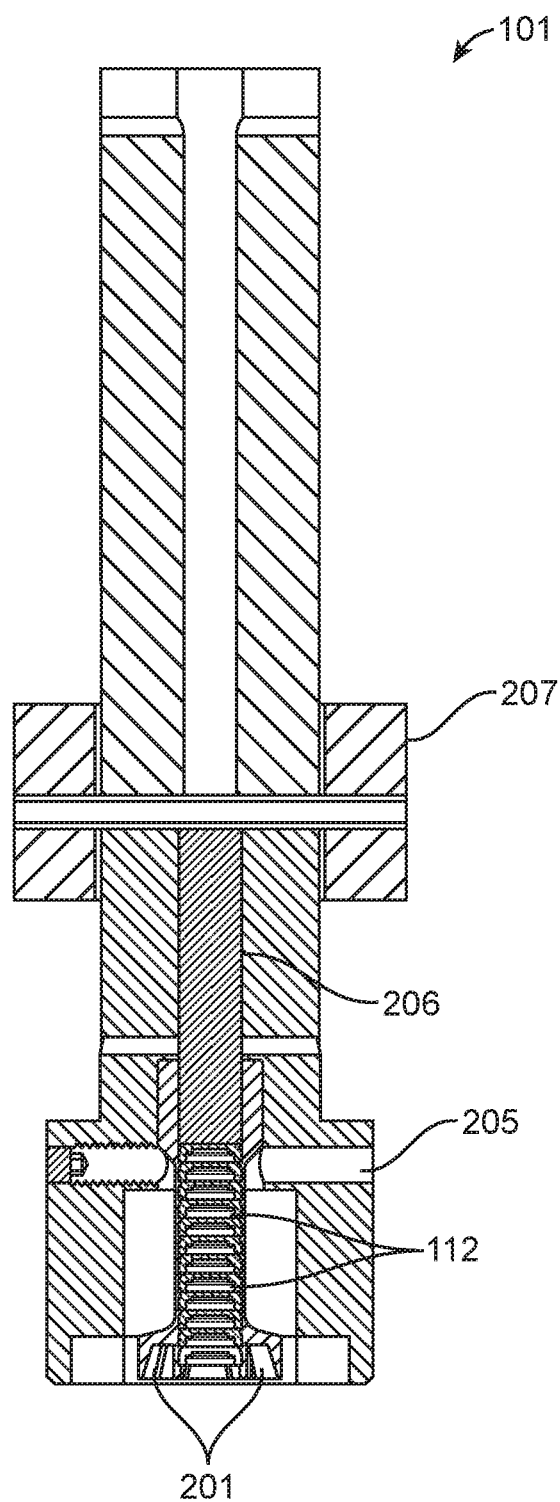

Loader station 101 may comprise a sample disk loader cartridge or magazine 200 (FIGS. 2A-E). The bottom end of cartridge 200 is configured to mechanically engage with stub 116 of sample disk holder 108. Stub 116 may be made of at least one of aluminum and aluminum alloys. When stub 116 is inserted into sample disk cartridge 200 actuated by stepper motor and Z-axis linear actuator 111, it causes flexible wings 201 (or loader mechanism) to flex outward and forces the release of a sample disk 112 from the stack of sample disks in cartridge 200 onto the stub 116. As shown in FIG. 2C, the surface of each disk 112 is separated from another disk on account of its geometrically capped shape 204 of each disk 112. The metal sample disk is held in place on the stub using a suitable magnet 202 mounted on the end of stub 116. Withdrawing stub 116 from cartridge 200 causes the arms or wings 201 to return inward and tabs 203 engage with the next available disk (FIG. 2D). The next available sample disk is now in position to engage with stub 116 for sampling of a subsequent sample. In sample disk cartridge 200, the next available disk 112 is held in place using tabs or hooks 203. The sample disks are positioned in place using loader mechanism retainer 205, push road 206, and weight 207.

Camera station 104 may comprise a microscope camera and a digital camera removably affixed to mount bolt 104'. These cameras may be used to review the image of the disk between stations, for example, to check whether a fresh disk 112 has been properly loaded from the loader 200 (whether a fresh disk has been extracted at loader station 101), whether the sample deposited at sample capture station 103 is of a desired spot size, and whether the sample has sufficiently dried. System 100 may also comprise a data logging system to log the position and sample details (e.g., camera image) collected during the course of the analysis. Optionally, when sample disk holder 108 is positioned at sample collection station 103, the running of the suction pump may be initiated when the particle counts in ambient air, as measured using a suitable counter, exceed a predetermined threshold. Other types of cameras that may be used at camera station 104 include fluorescence microscope cameras, hyperspectral imaging cameras, and thermal imaging cameras. For example, hyperspectral and thermal imaging cameras may be able to more accurately measure the mass of sample collected and the degree to which the sample has been dried. Stub 116 may form a vacuum tight seal with the vacuum chamber of a TOF-MS using O-ring seal 119.

After concluding analysis at TOFMS station 106, sample disk holder 108 is configured to return the used or spent disk to spent disk cartridge at station 102. Stub 116 with a spent disk held in place using magnet 102 is raised to engage the disk with the flexible arms 201 of cartridge at station 102. Finite element analysis shows that about 0.1 lb. outward force exerted on the flexible arms by the stub produces a radial displacement of about 0.015 in., which is sufficient to release tabs 203 and move the spent disk into the spent sample disk cartridge at station 102.

Figure 12:
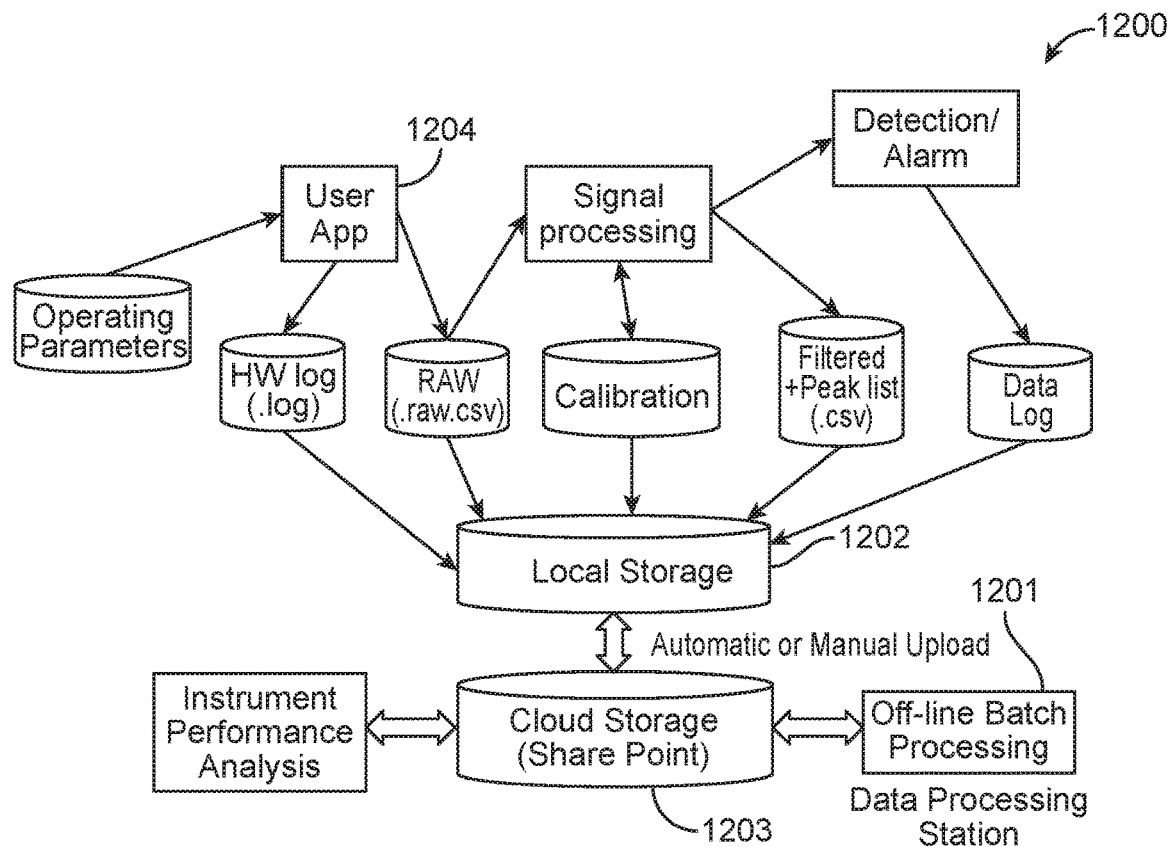
FIG. 12 is an exemplary schematic diagram showing data management related to an autonomous aerosol sample capture and analysis system.
Figure 13:
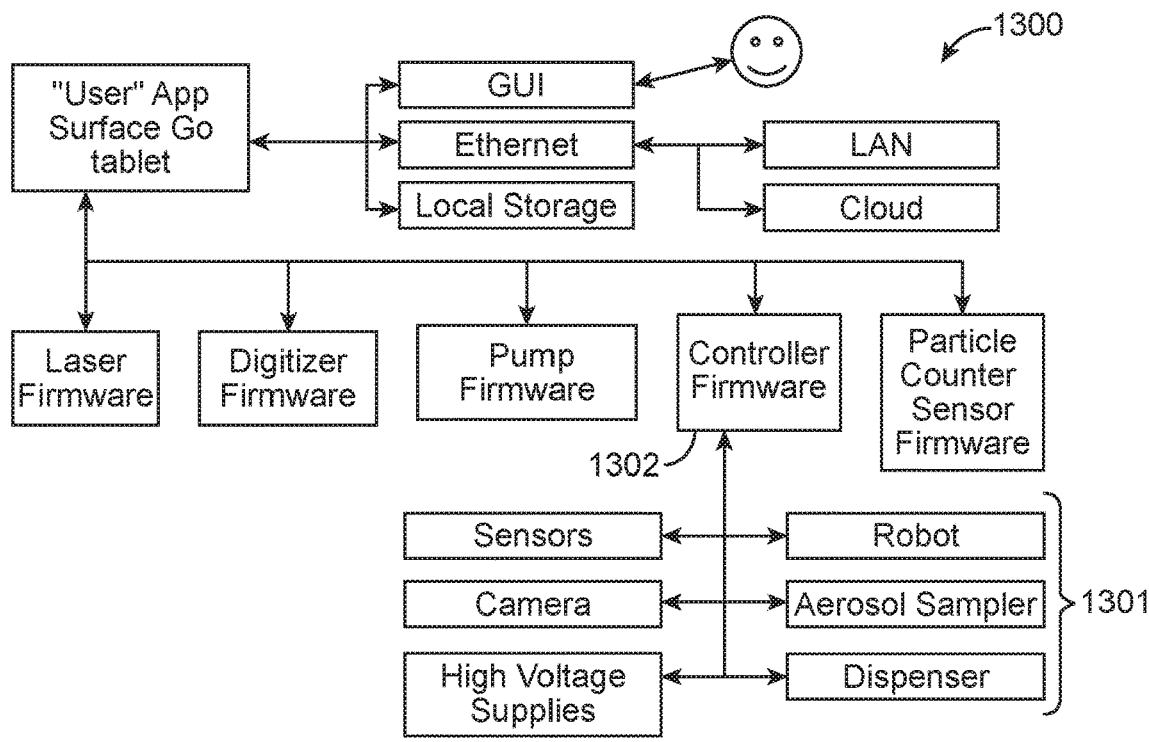
FIG. 13 is an exemplary schematic diagram showing software design for an autonomous aerosol sample capture and analysis system.

System 100 may also comprise a data processing system for acquiring and processing data output from the analysis station. Data processing may comprise the steps of filter/smoothing, baseline subtraction, signal to noise ratio estimation, peak detection, feature extraction, detection and classification and reporting including reporting via a user interface. Detection and classification may be achieved by comparing with reference spectra to identify the composition of the aerosol particles in the sample (e.g., biohazard particles that include, but are not limited to, ricin). Machine learning (ML) techniques for analyzing collected spectral data obtained using a machine learning engine offers a significant improvement to manual data processing for analyte identification, which is slow and labor intensive. Machine learning is generally a subset of artificial intelligence and comprise algorithms whose performance improve with data analysis over time. Supervised machine learning methods may be used. Supervised learning comprises the task of learning a function that maps an input to an output based on example input-output pairs. It infers a function from labeled training data consisting of a set of training examples. Machine learning also includes deep learning methodologies which are unsupervised learning methods that can identify signatures in complex data sets without the need to a priori identify specific features. Unsupervised machine learning methods and semi-supervised (hybrid methods between supervised and unsupervised learning) may also be used. Unsupervised learning methods may comprise a type learning that helps find previously unknown patterns in data set without pre-existing labels. Two exemplary methods used in unsupervised learning are principal component and cluster analysis. Cluster analysis is used in unsupervised learning to group, or segment, datasets with shared attributes in order to extrapolate algorithmic relationships. Cluster analysis is a branch of machine learning that groups the data that has not been labelled, classified or categorized. Cluster analysis identifies commonalities in the data and reacts based on the presence or absence of such commonalities in each new piece of data. This approach helps detect anomalous data points. Unsupervised learning methods may be used for anomaly detection, which can be helpful in identifying previously unknown hazards. For example, air samples may be analyzed at periodic intervals to measure the composition of particles in air and to identify the properties of the particles (e.g., size, shape, fluorescence) and spectra associated with particles to get a baseline data information of particles in "normal" ambient air. Particles in ambient air after an event such as the release of biological threat agents into the atmosphere would provide particle property data and spectral data that deviate from baseline data and would highlight an anomaly (as evidenced by anomalous spectra) and provide an opportunity to take necessary remedial steps to mitigate the threat. The compiled spectral data may be compared with a training data set comprising of a knowledge base of known biological matter spectra to predict particle composition. An exemplary sample preparation and analysis system may be in data communication with the machine learning engine to allow for updating the training data set knowledge based and improving the prediction of composition over time. Biological matter mass spectra cover a range that is about three orders of magnitude greater than chemical mass spectra, significantly complicating the application of automated techniques. In addition, environmental contaminants can reduce signal strength by competing with the target during the ionization process (competitive ionization), a introduce signature components (clutter) that must be deconvolved with the target signature. Current automated methods are mostly limited to searching for very pure targets in samples with no environmental clutter. The disclosed exemplary methods eliminate competitive ionization by physically separating target analyte from clutter and eliminates ambiguities in the signature (each event is assumed to be an either target or clutter). Additional details on integrating machine learning methods for analysis of spectral data related to aerosol samples are disclosed in commonly owned U.S. Prov. Pat. Appl. No. 62/868,906 titled "Methods and Systems for Detection of Aerosol Particles Without Using Complex Organic MALDI Matrices," which is incorporated by reference herein in its entirety. Alternately, data output from the analysis station may be processed using an external data processing station 1201 (FIG. 12) in data management system 1200 and data may be transferred from system 100 to the processing station via wired (ethernet, LAN) or wireless bidirectional communication. Data in various formats such as raw data, filtered data, data logs, alarms and operating parameters may be stored in at least one of local storage server 1202 and remote or cloud storage server 1203. The servers are configured to be in bidirectional secure communication with the data processing station 1201. A mobile application software 1204 ("app") may also be configured to monitor the operating status of exemplary system 100, initiate data processing, and view and report output or results from data processing station 1201. A mobile application software or "app" is a computer program configured to run on a mobile device such as a smart phone, tablet or watch. An app comprises a front-end component or user interface ("UI") and is designed to provide the user with an easy-to-use and friendly interface. The front end communicates with a back-end component which facilitates data routing, security, authentication, authorization, working offline, and service orchestration. An app may also communicate with one or more intermediate or middle components including, but not limited to, mobile app servers, message queuing, enterprise service bus ("ESB") and other service-oriented architecture ("SOA") infrastructure components. Data synchronization between the mobile device and a database or cloud and offline (without internet connection) capabilities are key to the seamless functioning of successful mobile apps. Providers of database and cloud services such as Couchbase Mobile (Couchbase), Azure Mobile Services (Microsoft), Cognito (Amazon), Firebase (Google) offer synchronization and offline capabilities with their mobile offerings. The app should preferably provide for secure data access communication with synchronized and decentralized storage, transmission and storage using features such as address authentication, data at rest, which relates to whether the app supports file system encryption and data-level encryption, data in motion, and read/write access that defines what data may be accessed and changed/modified by users. Databases may be relational (SQL databases such as Oracle, mySQL) or NoSQL (e.g. MongoDB, CouchDB). Further, for decentralized data writes on mobile platforms, the same data can be simultaneously modified on multiple devices and may create a conflict between data access from multiple devices. The app should preferably incorporate a mechanism for resolving those conflicts. The conflict resolution mechanism may allow resolution automatically, on the device, in the cloud, or could be manually initiated. FIG. 13 is an exemplary schematic diagram showing software design 1300 for system 100. The operation of components 1301 in system 100 are controlled by controller 1302. As previously disclosed, a mobile application software ("app") may be configured to monitor the operating status of exemplary system 100, initiate data processing, and view and report output or results.

System 100 may comprise a plurality of loader stations 101. For example, a first loader station 101 may comprise disks 112 coated with MALDI matrix and a second loader station 101 may comprise uncoated disks. Exemplary system 100 may also comprise a loader station 101 comprising a stack of alternating coated and uncoated disks. In the event a coated sample disk is needed and an uncoated sample disk is at the bottom of the fresh sample disk stack or cartridge 200, the uncoated sample disk may be pulled from the fresh disk stack 200 and moved to the spent disk stack to cartridge at station 102, thereby allowing the robotically operated sample holder 108 to access an uncoated sample disk 112 in the fresh disk stack. These movements between fresh cartridge in loader station 101 to spent cartridge at station 102 may be accomplished in less than about 10 s and preferably in less than about 5 s. Further, system 100 may comprise a plurality of loader and unloader stations that reside on a carousel. As one sample disk cartridge is exhausted, the carousel may rotate to present a fresh sample disk cartridge containing a fresh stack of coated or uncoated sample disks. Alternatively, two carousels may be provide—one for fresh sample disks and one for spend sample disks. Machine learning techniques may also be used for the analysis of images produced by camera station 104. For example, a neural network may be trained to determine if a sample disk 112 has been properly loaded at station 101, or properly unloaded at station 102, or assess if the sample is dry or requires drying.

In another exemplary method for analysis of chemical aerosol particles, pre-depositing the disks with a MALDI matrix may not be needed. Examples of chemical aerosol particles (threat agents) include, but are not limited to, are ricin, fentanyl, and carfentanyl. These chemical agents are relatively easy to produce and may be more readily available that biological agents such as anthrax and have been recently used as a chemical weapon. During sample preparation of samples comprising these non-biological chemical aerosol particles, the aerosol particles may be directly deposited on the sample disk or substrate that is not precoated with a MALDI matrix, dried if necessary, and analyzed using a TOF-MS that is operated as Laser desorption/ionization mass spectrometer (LDI-TOFMS). Laser Desorption/Ionization-Time of Flight Mass Spectrometry (LDI-TOFMS) may be used for analysis of small organic compounds (<1000 Da) and inorganic compounds because it does generate significant fragmentation of molecular ions during ionization and enables the determination of molecular weights and molecular structures in organic compounds. MALDI TOFMS would be preferable for large organic compounds such as polymers.

Figure 3:
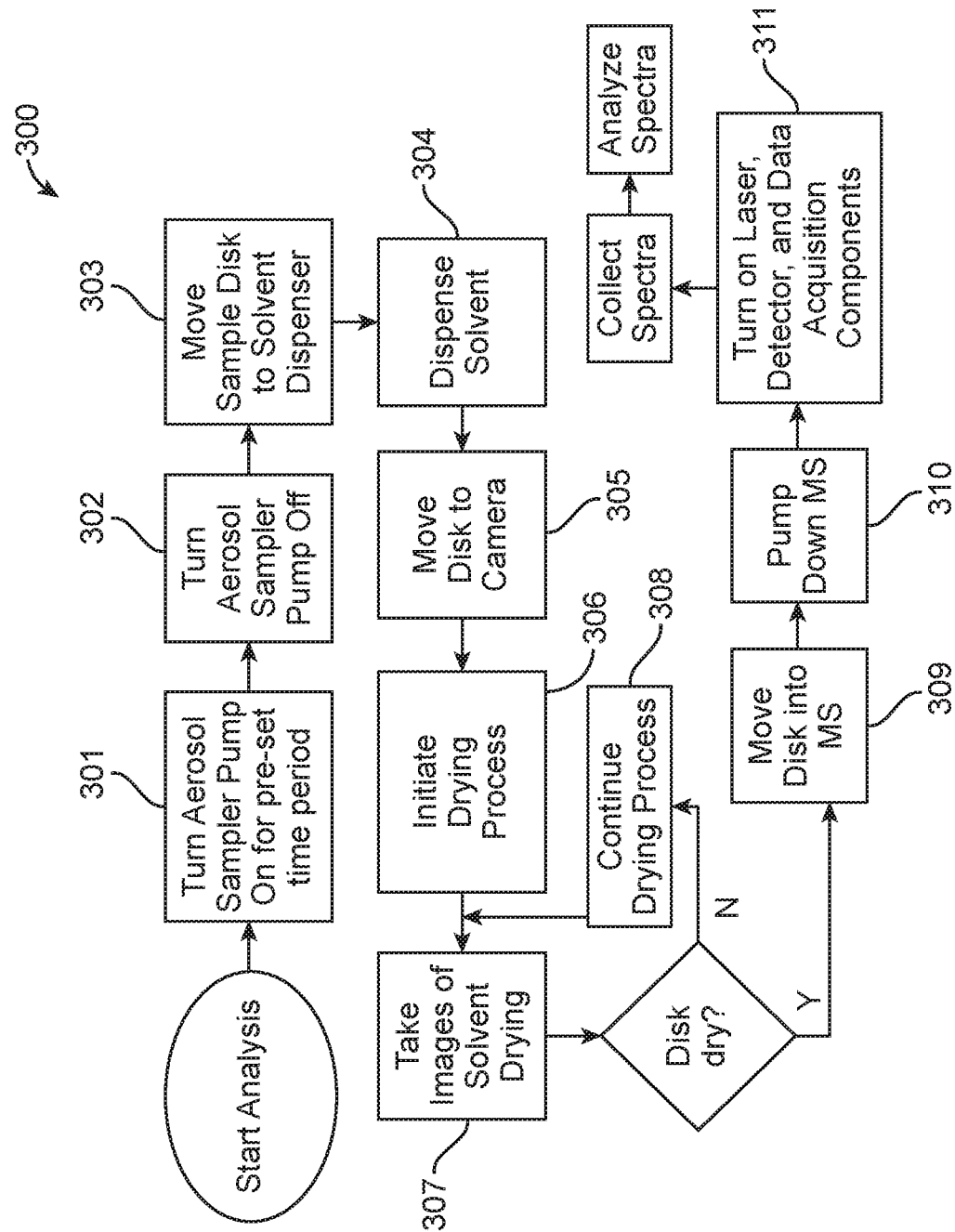

In an exemplary method 300 (FIG. 3), sample disk holder 108 having a fresh disk 112 pre-coated with MALDI matrix is moved from TOFMS station 106 to station 103 for impacting the disk with the aerosol sample. Prior to moving the sample from station 106, the gate valve of the TOFMS station is closed. In step 301, the aerosol pump is turned-on for a predetermined time to draw ambient air into tubing 113 and to impact particles on coated disk 112. In step 302, the pump is turned off and the sample disk holder 108 is moved to station 105 in step 303 for treating the deposited sample with chemicals in step 304. In step 305, the sample disk holder having the disk is then moved to camera station 104 for examination using at least one of a microscope camera or imaging using a digital camera. In step 306, drying of the sample is initiated. The sample is periodically monitored by taking images of the sample in station 104 (step 307) and drying is continued (step 308), for example by heating the sample using a heater, if images show that the sample is still wet. If the sample is sufficiently dry, the sample holder is moved to station 106 for TOFMS analysis. In step 309, the sample stub 116 is sealed with the vacuum chamber of the TOFMS and the chamber is pumped down in step 310. If the sample heater is present and has been turned on, the heater is turned off. The ionization laser of the TOFMS is triggered in step 311, spectra is collected in step 312 and analyzed in step 313.

Figure 4:
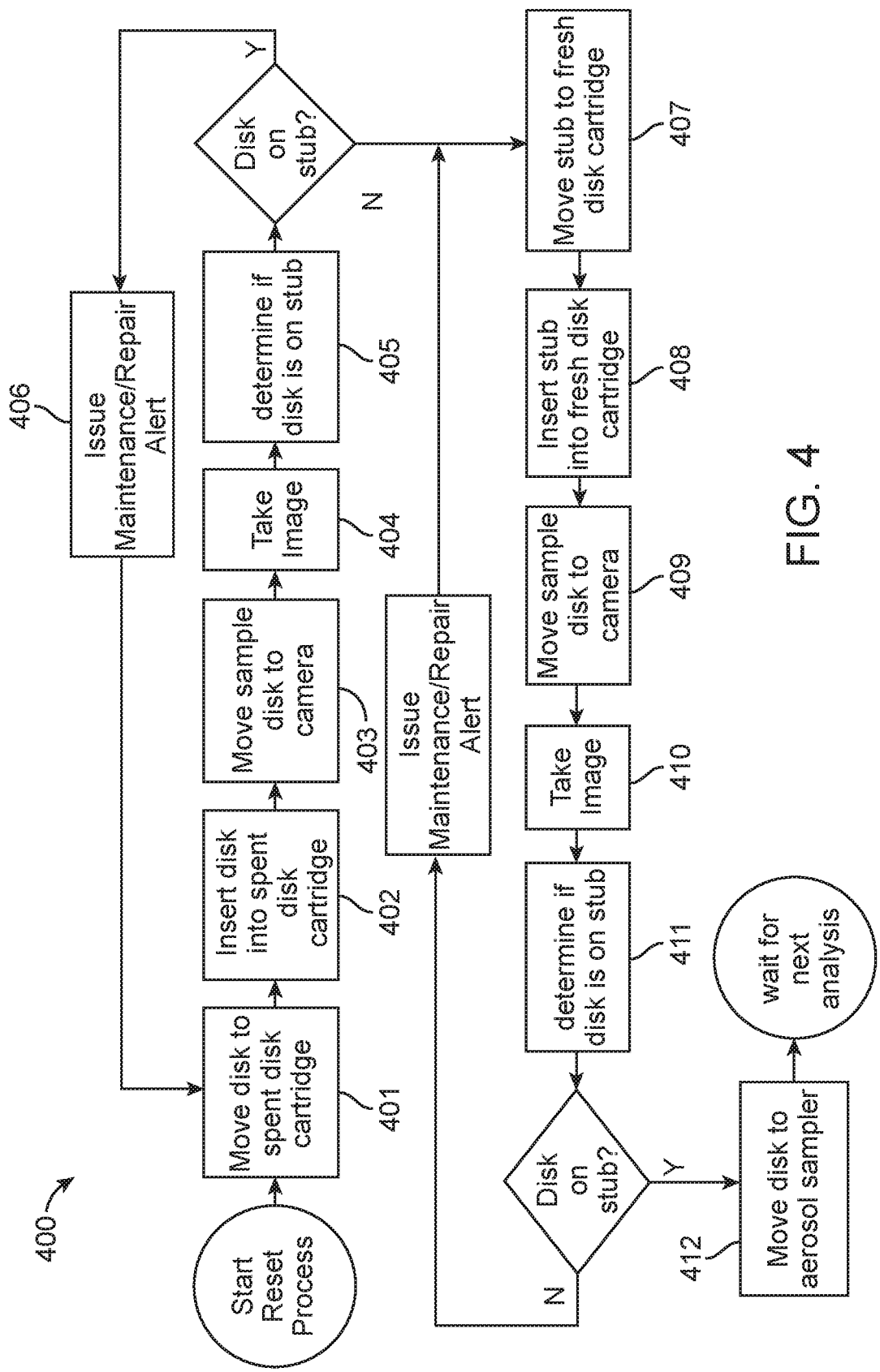

In an exemplary method for resetting system 100 for a new analysis, the reset process 400 (FIG. 4) comprises the steps of moving the spent disk to spent disk cartridge at station 102 (step 401) and inserting the disk into cartridge station 102 (step 402), moving the stub to station 104 for imaging (step 403) to check if the spent disk has been removed from the stub in step 405. If the spent disk is still present on the stub 116, a maintenance alert is raised in step 406. If the images show that the spent disk has been removed, sample disk holder 108 is moved to fresh disk cartridge station 101 in step 407, and stub 116 is inserted into the cartridge at station 101 in step 408. The stub is moved to station 104 for imaging in step 409 and images are collected in step 410. If images show that the disk is present on stub 116 in step 411, sample disk holder 108 is moved to the aerosol sampling station 103 for sample collection. If the disk is not present, a maintenance alert is raised. Machine learning methods may be used to automate the review of images taken during the reset process. If a disk is present after step 411, the sample disk holder is moved to station 106 (the MS station) in step 412 so that the fresh sample disk 112 may be stored under vacuum. The gate valve on the TOFMS system may then be opened, exposing the fresh disk to vacuum.

In another exemplary method, aerosol particles may be collected onto a substrate by impaction as disclosed in U.S. Pat. Pub. No. 2003/0020011, which is incorporated by reference herein in its entirety. A virtual impactor, or multiple stages of virtual impaction, may be incorporated into sample collection station 103 to concentrate the aerosol particles prior to impaction on sample disk 112 as described in U.S. Pat. No. 7,799,567 "AIR SAMPLER BASED ON VIRTUAL IMPACTION AND ACTUAL IMPACTION," which is incorporated by reference herein in its entirety. A MALDI matrix solution may then be added to the sample. The MALDI matrix solution may comprise alpha-cyano-4-hydroxycinnamic acid dissolved in a solvent. Solvents may include acetonitrile, methanol, water, ethanol, and acetone. The MALDI matrix solution is spotted on to the analyte on a MALDI plate to yield a uniform homogenous layer of MALDI matrix material on the analyte. The solvents vaporize, leaving only the recrystallized matrix with the analyte spread through the matrix crystals. The coated plate or substrate dried and analyzed in a TOFMS. "Whole cell" analysis can provide identification in less than about 5 min.

In another exemplary method, the system further comprises at least one of an aerodynamic particle sizer, an optical particle counter, and a device that provides for fluorescence or depolarization measurement on each particle. An exemplary aerosol particle sizer is manufactured by Air Techniques International, Inc. (Maryland). Measurement techniques such as fluorescence and depolarization assist in distinguishing threat aerosol particles from normal ambient aerosol particles, as making this determination based solely on size and counts per unit of time is unreliable. This optical detection component is preferentially added in parallel or upstream of the impaction collection step. Information about the size of particles associated with the threat aerosol particles may be used to optimize the collection of these particles. For example, particles with mean particle diameter of about 1µ require a higher velocity to drive impaction than particles with mean particle diameter of about 3µ. The mass of the about 3µ diameter particles is about 27 times greater than that of the about 1µ particles, assuming particle densities are comparable. Since inertial separation is proportional to particle mass and particle velocity, the operation of the pump used in aerosol collection station 103 may be adjusted to cause a higher air flow velocity through the nozzle for the 1µ particles or slowed down to decrease air flow velocity if the particles to be collected were larger in size (e.g., about 34µ). As a result, the optical detector may be utilized to optimize the collection efficiency of aerosol particles based on the mean particle diameter of the threat aerosol particles. In addition, the number density of threat particles, as measured by the optical detector, may be used to determine the duration of the sampling period. For example, if the threat aerosol is a dense aerosol with a high particle loading of threat particles, a shorter sampling period may be sufficient to obtain a good sample; when the threat aerosol concentration is dilute, a longer sampling period would be required.

In another exemplary method, the aerosol particles may be collected into a liquid by impaction or impingement, for example, using an impactor device as disclosed below. The sample may then be subjected to enzyme or hot acid treatment for several minutes. Digestion may be done at about 140° C. for about 15 min. Hot Acid cleaves proteins at aspartic acid (Asp) residues creating highly specific peptides. Chemical digestion of the protein signature molecules will provide a proteomic peptide map in about 15 minutes. Individual peptides may be micro-sequenced to identify amino acid sequences of known biomarkers. For "catalytic" toxins that include, but are not limited to, ricin, botulism toxin, abrin, an activity assay may unambiguously determine that "live" toxin is present in the sample. This assay may take between about 1 h and 2 h to complete. MALDI matrix solution is then added to the treated sample. The sample may be dried and analyzed in a TOFMS.

Autonomous sample analysis is not limited to mass spectrometry and optical imaging. In another exemplary method for analyzing a sample collected on the sample disk, fluorescence microscopy, RAMAN spectroscopy, surface enhanced RAMAN spectroscopy, scanning electron microscopy, and other surface-based analyses may be employed at other discrete stations in system 100 and accessible to the sample holder 108 and the sample handling robotic carriage 109.

In an exemplary method for collection and analysis of biological aerosol particles such as anthrax, a MALDI matrix chemical in a solvent may be deposited on a substrate that includes, but is not limited to, disks made of a suitable metal, metal alloys and other high electrical conductivity materials. An exemplary sample disk 112 may be 6 mm in diameter and may be held in a sample disk holder 108. The MALDI matrix chemical may comprise alpha-Cyano-4-hydroxycinnamic acid dissolved in a solvent. Solvents may include acetonitrile, water, ethanol, and acetone. The matrix chemical may be substantially dried to form a thin film on the disk. The pre-coated disk may then be placed under a spotting nozzle that is capable of depositing sample aerosol particles onto the disk in a sampling period of less than about 1 min. The sample aerosol may comprise particles in ambient air. Other chemicals such as tri-fluoro-acetic acid (TFA), alcohol and water or mixtures thereof may be added to the deposited sample. TFA is normally added to suppress the influence of salt impurities on the mass spectrum of the analyte and to leach acid-soluble protein from the surface layers of bacterial spores and viruses. Water enables hydrophilic proteins to dissolve, and acetonitrile or organic solvents enable the hydrophobic proteins and lipids to dissolve. Prior to the addition of chemicals, one or more images of the sample spot may be captured using a suitable camera. Images of the sample spot may be collected and analyzed after the chemical treatment to monitor the drying process and to determine if the sample has substantially dried. High magnification imaging may be used to provide information about the morphology of the collected particles. Florescence imaging or thermal imaging may be used to provide additional information about the location of material on the disk or the dryness of the sample. The drying process may be accelerated by passing warm air over the drying sample spot or heating the sample disk, for example by bringing an inductively or a resistance heated surface into physical contact with the sample disk or incorporating an inductive or resistive heating element into the sample disk holder 108. Warm air used for drying may be dehumidified by flowing it through a bed of desiccant material to further enhance the drying process. An infrared emitter element which emits wavelengths that are strongly absorbed by water may also be used, for example, in the mid-infrared region. The sample on the disk generated using the exemplary methods result in a small, round, substantially dry aerosol spot or deposit, at or near the center of a sample disk. The disk may be precoated with a MALDI matrix chemical solution prior to sample deposition. Alternately, a MALDI matrix chemical solution may be mixed with the deposited sample prior to drying. System 100 may also comprise a dedicated drying station in which the sample is dried under vacuum. At least one of the roughing pump and the turbopump associated with the TOFMS in station 106 may be fluidly connected to the drying station.

The sample may then be analyzed using a mass spectrometer. For example, between about 2 and about 200 discrete mass peaks (spectra) characteristic of the sample may be generated by exposing the sample to at least one laser ionization pulse. The number of laser ionization pulses may be between about 1 and about 20. Pre-deposition of the MALDI matrix as a thin film prior to adding the aerosol sample avoids the need to nebulize the matrix and/or the aerosol prior to depositing on the disk and provides for aerosol particles that substantially uniformly MALDI-matrix coated aerosol particles. The exemplary methods also improve adhesion of particles, potentially due to the addition of surface roughness or surface stickiness, and thus, avoid or minimize loss of aerosol particles when a high velocity stream impinges on a collection surface creating a tendency of the particles to "bounce-off" the substrate after impaction. An optimal air flow velocity to minimize bounce-off while maximizing the number of particles that impact the surface is about 75 m/s, but may vary between about 50 m/s and about 150 m/s, depending on the properties of the impaction surface, the orifice diameter, and particle cut size. The particle cut size is the diameter of particle for which half of the particles of this size are collected by the impactor and half are transmitted through the impactor.

The exemplary method described above may be configured to be autonomous. For example, an exemplary aerosol sampling robotic system 100 may be used to perform the steps of:

(a) selecting a sample disk or substrate from a fresh disk cartridge or container comprising one or more disks;
(b) positioning the disk comprising the MALDI matrix under a first nozzle to deposit sample aerosol particles collected using a suitable device;
(c) positioning the disk comprising the aerosol sample under a second nozzle for treating the sample with a treatment solution comprising at least one of TFA, alcohol and water;
(d) substantially drying the sample on the disk;

(e) moving the disk to a mass spectrometer sample station;

(f) initiating the analysis process and generating mass spectral data;

(g) disposing the spent disk, for example, by removing the disk to a spent disk cartridge or container.

The exemplary method described above may further comprise capturing a digital image of the disk by moving the sample holder comprising the disk to camera station 104 between two consecutive steps to examine if the sample holder has extracted a disk from loader station 101 in step (a), whether sample has been deposited in step (b), whether drying is substantially complete in step (d), and the like. Camera station 104 may comprise one or more light sources (e.g., light emitting diodes or LEDs) to illuminate the surface of the disk. For example, the image of the surface of a disk having a liquid droplet comprising a sample or treatment solution on it would typically have a glassy smooth surface capable of reflecting light, for example, via specular reflection, which may be considered to be a mirror-like reflection of light from the surface. The image may therefore show the discrete LEDs illuminating the surface. In contrast, when the disk is substantially dry, that is when effective drying is achieved, the surface tends to scatter light and the image does not show the discrete LEDs illuminating the surface. Examination of digital images collected during the steps may also be automated by comparing the captured image after each step with a library of standard or baseline digital images to decide if the sample disk holder 108 comprising the disk should be moved to the next step or whether the disk should be discarded at spent disk cartridge 102. The samples on the post-analysis disks may also be extracted and analyzed using PCR (polymerase chain reaction) and other biomolecular or microbiological techniques to confirm MALDI TOFMS results if needed.

The initiating the analysis process step (f) may comprise the steps of evacuating the MS station 106 with the sample disk holder 108 sealed to it to less than about $10^{-5}$ torr, and preferably less than about $5\times10^{-6}$ torr, applying a voltage to the electrically conductive disk to generate a strong electric field in the region near the surface of the disk, focusing a laser pulse to vaporize the MALDI matrix and analytes and generating ions, and accelerating the ions to the detector by controlling the direction of the electrical field.

The exemplary method may further comprise the step of positioning an uncoated disk under a third nozzle for depositing the MALDI matrix solution and substantially drying the matrix.

Sample aerosol particles may not be limited to collection by impaction at station 103. Sample aerosol particles may be also collected using a suitable impaction or liquid impingement device that is used for collecting particulates (e.g. sample aerosol particles) dispersed in gaseous streams (e.g., ambient air). Aerosol particles usually concentrate in a small volume of water or a liquid and may be spotted on a disk using a dispensing station similar to that of station 105. An impact device forces a large volume of air into the device, and concentrate any particulates collected to provide a high-quality representative sample. U.S. Pat. No. 6,267,016, which is incorporated by reference herein in its entirety, discloses a rotary collector comprising a combined impact collector and fan, which draws in air or other gaseous fluid in which particulates are entrained into a cavity, and then separating the particulates from the gaseous fluid by providing a rotating surface that impacts the particulates. The particulates also impact on other surfaces within the cavity, including its inner surface, and are washed from these surfaces, which are wetted with water or other liquid injected into the cavity. The water or other liquid is either continuously or intermittently injected into the cavity to wash the particulates from the impeller vanes and other surfaces on which they have impacted. The particulates are carried by the liquid through a threaded drain port, into a receiver that includes an exhaust port for the air or gaseous fluid. A pump recirculates the liquid from the receiver through a conduit that sprays the liquid into the cavity through the inlet port. The particulates collected in the receiver provide a specimen that can be analyzed to detect or identify the particulates that were entrained in the air or other gaseous fluid. U.S. Pat. No. 6,695,146 discloses a virtual impactor to separate a flow of fluid into a major flow and a minor flow, such that the minor flow contains a higher concentration of particulates of a desired size. The minor flow is directed toward an archival surface, causing the particulates to impact against and be deposited on the archival surface. Over time, the archival surface and the virtual impactor are moved relative to one another such that particulates collected at different times are deposited as spaced-apart spots on different portions of the archival surface. The particulates are stored on the archival surface until analysis of the particulates is required. The archival surface can be coated with a material that enhances the deposition and retention of the particulates and can further be coated with materials that sustain the life of biological organism particulates deposited on the archival surface. The disclosures of U.S. Pat. Nos. 6,695,146, 6,290,065, 6,062,392, and 6,363,800 are incorporated by reference herein in each of their entirety.

U.S. Pat. No. 7,799,567 discloses a method for removing particles from a fluid stream, such as air, and depositing the particles on one or more collection surfaces. A pre-filter is employed to reject oversized particles and contaminants, such as rain and insects. A concentrator is employed to increase a concentration of particles larger than a predefined particle size in at least a portion of the fluid, producing a concentrated volume of fluid. The concentrator and pre-filter can, for example, be virtual impactors. The disclosures of U.S. Pat. No. 7,799,567 and U.S. patent application Ser. No. 11/385,326, U.S. patent application Ser. No. 11/058,442, U.S. patent application Ser. No. 10/366,595, and U.S. Pat. Nos. 6,887,710, 6,729,196, 6,363,800, 6,951,147, and 6,267,016 are incorporated by reference herein in each of their entirety. Further, U.S. Pat. No. 7,759,123, the disclosure of which is incorporated by reference herein in its entirety, discloses a method and apparatus for removing concentrated spots of collected particulates from an impact collection surface and transferring those particulates into a container suitable for preparing a liquid sample. A jet of fluid is utilized to remove and transfer the particulates. If a liquid jet is employed, the quantity of liquid is minimized to avoid unnecessarily diluting the sample.

The aerosol particles to be analyzed need not be limited to particles found in ambient air. As one example, analyte aerosol could include exhaled breath particles (EBP) found in exhaled air of humans or animals. The volume of air exhaled during breathing in healthy adults is typically between 1-2 liters, which includes a normal tidal volume of about 0.5 liters. Humans produce exhaled breath particles (EBPs) during various breath activities, such as normal breathing, coughing, talking, and sneezing. EBP concentrations from mechanically ventilated patients during normal breathing may be about 0.4 to about 2000 particles/breath or 0.001 to 5 particles/mL. In addition, the size of the EBP's may be below 5 micrometers, and 80% of them may range from 0.3 to 1.0 micrometers. Exhaled particle size distribution has also been reported to fall between 0.3 and 2.0 micrometers. The mean particle sizes of EBPs may be less than 1 micrometer during normal breathing, and 1 to 125 micrometers during coughing. Further, 25% of patients with pulmonary tuberculosis exhaled 3 to about 600 CFU (colony forming unit) of *Mycobacterium tuberculosis* when coughing, and levels of this pathogen primarily ranged 0.6 to 3.3 micrometers. These bacteria are rod shaped and are about 2 to 4 micrometers in length and about 0.2 to 0.5 micrometers in width. Commonly owned U.S. Prov. Pat. Appl. Nos. 62/891,954 and 63/069,120 titled "DIAGNOSIS OF TUBERCULOSIS AND OTHER DISEASES USING EXHALED BREATH," and incorporated by reference herein in each of its entirety, disclose an autonomous system for diagnosis of TB using exhaled breath comprising a sample collection subsystem and a sample analysis subsystem. The sample collection subsystem may comprise a sample extraction component configured to receive an individual's face for extracting at least one of breath aerosol (EBA) particles and lipids biomarker characteristic of *Mycobacterium tuberculosis* (Mtb) expelled from the individual during predetermined breath maneuvers into a flow of air fed into the extraction component, a sample capture component fluidly connected to the sample extraction component by an interface tubing and configured to separate and collect EBA particles and lipids from exhaled breath and air as a collected sample. One or more chilling devices are configured to be in thermal communication with the walls of at least one of the interface tubing. An example of a thermoelectric cooling device is manufactured by Marlow Industries (Dallas, Tex.). The sample capture component and a sample analysis subsystem are fluidly connected. The collected sample may be concentrated on a sample plate using a station that is similar to station 105 used for dispensing chemicals. The volume of the collected sample may be less than about 1 ml. The volume of the collected sample may be less than 100 μL and may be less than 2 μL. Methods and devices, that include, but are not limited to membrane-based separation or evaporation may be used to concentrate the liquid sample from milliliter volumes to microliter volumes.

Microbial cell walls or spore coats may be opened or "lysed" to improve analysis of microbes using exemplary system 100 by exposing more of the microbe's characteristic cell contents to MALDI analysis. U.S. Pat. No. 5,989,824 titled "APPARATUS AND METHOD FOR LYSING BACTERIAL SPORES TO FACILITATE THEIR IDENTIFICATION" discloses use of a plasma or electric discharge to break open cells or spores resting on a metal substrate and is hereby incorporated by reference herein in its entirety. Lysing may also be achieved using chemical, focused acoustic, and focused electromagnetic treatments.

A liquid sample may be obtained from an exhaled breath aerosol collector, or from any process involving liquids or suspensions of solids in liquids. A liquid sample processing component may be required to remove impurities such as salts, or to concentrate or chemically modify the sample so as to enhance the performance of the analysis system. For example, $C_{18}$ resins may be used to remove salts form a liquid sample. As discussed earlier, enzymes or hot acid treatments may be used to break proteins into peptides that are more accurately associated with a particular target analyte. Micropillar arrays may be used to size sort or size select particles and then concentrate or declutter specific target particles from a complex or dilute suspension. The exemplary methods and devices may further comprise these sample preparation aspects. Commonly owned U.S. Prov. Pat. Appl. Nos. 63/005,179, and 63/010,029 titled "DIAGNOSIS OF RESPIRATORY DISEASES USING EXHALED BREATH," and 63/069,029 titled "DIAGNOSIS OF RESPIRATORY DISEASES USING ANALYSIS OF EXHALED BREATH AND AEROSOLS," and incorporated by reference herein in in each of its entirety, disclose a breath sample collection system for diagnosis of a respiratory disease using exhaled breath and other aerosols comprising a sample capture element comprising a packed bed column to selectively capture the non-volatile organic components.

In another exemplary method, the methods previously described may be modified when the sample comprises both biological and chemical particles. A bare disk or substrate (without any MALDI matrix coating) may be positioned under the spot sampler and an aerosol sample collected using any one of the previously disclosed collection devices may be deposited on the disk. The disk may then be transported to an LDI-TOFMS instrument for analysis of the chemical composition and identification. The same sample disk may then be transported to a station in the exemplary device 100 where chemicals are added to the sample spot. The chemical mixture may comprise alpha-Cyano-4-hydroxycinnamic acid, methanol, TFA, and water. The sample may be dried and analyzed in a MALDI-TOFMS for biological composition and identification. Subsequently, both chemical and biological threat aerosol particles may be rapidly identified from a single sample.

In exemplary system 100, fresh sample disks may be stored in two separate locations, namely, one location at which with disks coated with MALDI matrix are stored and another location at which disks that are uncoated are stored. Alternately, alternating sample disks could be coated and if a coated sample disk is needed when an uncoated sample disk is at the bottom of the fresh sample disk stack, the uncoated sample disk could be pulled from the fresh disk stack moved to the spent disk stack, thereby allowing the robot to access an uncoated sample disk in the fresh disk stack. These movements may be accomplished in a matter of several seconds.

To identify the presence of biological threat agents in the atmosphere, air samples may be collected at predetermined time intervals and analyzed using the exemplary methods disclosed above to generate a historical data set (training data set) of background/baseline information. Analysis may be improved by time using machine learning algorithms. Variations in background information may be modeled to map out normal behavior of the atmosphere in a protected area. When a release of biological, biochemical, or chemical aerosol particles is suspected, sampling of air using the exemplary methods described above will result in information that deviates from historical background information. The first signature of the presence of such a threat will be a sharp deviation from the normal background. At this stage, algorithmic decisions may be made as to the composition of each individual particle. Remedial actions can therefore be taken quickly to protect human life and to prevent loss of life. For example, a building's heating, ventilation, and air conditioning (HVAC) system may be shut down to limit the spread of the aerosol and the fire alarm can be activated to evacuate the building.

The exemplary methods and devices disclosed above may also be used for analysis of liquid samples and a variety of samples, that include, but are not limited to semiconductor gas and liquid process streams. Liquid samples may be nebulized. In this case, an aliquot of the sample may be aerosolized using suitable means. For example, a nebulizer may be used to aerosolize the liquid sample in air. For example, a nebulizer may be used to aerosolize the liquid sample into a filtered flow of air.

Liquid samples, in particular, liquid samples of semiconductor process streams may comprise nanoparticle contaminants of particle size ranging from between about 1 nm to about 100 nm in ultrapure water (UPW). Liquid samples may also comprise chemical liquids that are at the beginning of the semiconductor fabrication process or front-end-of-line (FEOL) and chemicals that are used at the back-end-of-line (BEOL) stage of the fabrication process. Ultrapure water in the semiconductor industry refers to water has been treated to the remove almost all contaminants including biological (for example, bacterial matter), metals and metal cations (that include, but are not limited to sodium, boron, barium, iron, silicon and calcium) organo-metallic compounds, organic compounds such as polymers that leach from plastic components into water, anionic compounds, in particular those comprising chlorine and nitrate ions, and inorganic chemical compounds (e.g., ammonium nitrate), dissolved and particulate matter, and dissolved gases including dissolved oxygen. The chemical compounds may comprise volatile and non-volatile chemicals and could further comprise reactive and inert chemicals, hydrophilic and hydrophobic chemicals and the like. The requirements of UPW quality are outlined in standards that include, but are not limited to, as the ASTM D5127 "Standard Guide for Ultra-Pure Water Used in the Electronics and Semiconductor Industries" and SEMI F63 "Guide for ultrapure water used in semiconductor processing." UPW may also be used in the pharmaceutical and biotechnology industries. UPW may be used for cleaning semiconductor parts and components and for sterilization.

Analysis of liquid sample comprising nanoparticle contaminants (analytes) using exemplary system 100 may preferably comprise nebulizing the liquid sample to generate an aerosol comprising nanoparticles and water vapor and condensing water vapor onto the nanoparticles to increase or enlarge the size of the particles in condensation growth tubes for analysis using LDI-MS or other surface-based analytic methods. The aerosol comprising the large "grown" particles may then be deposited onto sample disk 112 at station 103 or concentrated by means of a virtual impactor as discussed above. Sample disk 112 may be fabricated from or coated with a metal that is not considered a contaminant, thereby eliminating interference from the sample disk itself. As discussed above, the liquid sample comprising nanoparticles may be nebulized using a stream of high velocity carrier gas (for example, air) exiting a suitable gas nozzle or orifice 1101 as it contacts a liquid droplet or liquid stream. The carrier gas flow may be perpendicular to the liquid sample flow (FIG. 11A). Alternately, the nebulizer may be in the form of an annular tube comprising an orifice at the exit (FIG. 11B). In this case, the liquid sample flows through the annulus and is forced out as an aerosol through the orifice by the carrier gas. TSI, Inc. (Shoreview, Minn.) markets a range of products for nebulizing liquids.

In one aspect, the target nanoparticles in the aerosol exiting the nebulizer are condensed or grown as described below to at least about 3 micron in size to enable detection TOF-MS and other optical detectors. Any method for concentrating the nanoparticles may be used. For examples, the nanoparticles may be subjected to condensation to grow particles to a size that can be detected optically. As disclosed in U.S. Pat. No. 7,736,421 "HIGH SATURATION RATIO WATER CONDENSATION DEVICE AND METHOD," condensational growth of ultrafine particles may be done using (1) adiabatic expansion, (2) turbulent mixing, or (3) cold-walled condenser tubes. Each of these methods creates a region of super-saturation, wherein the concentration of the condensing vapor is greater than its equilibrium vapor pressure at the local gas temperature. U.S. Pat. No. 6,712,881, "CONTINUOUS, LAMINAR FLOW WATER-BASED PARTICLE CONDENSATION DEVICE AND METHOD," discloses a method wherein an aerosol, or aerosol plus particle-free sheath air, flows in a laminar manner through a device or tube whose walls are wetted and held at a temperature warmer than the entering flow. Because the mass diffusivity of water vapor is larger than the thermal diffusivity of air, the transport of water vapor from the warm, wetted walls is faster than the rate at which the flow warms. This creates a region of water vapor super-saturation which has a maximum along the centerline of the flow, where super-saturation is defined as a water vapor content in excess of the equilibrium water vapor content. Particles as small as 5 nm may be condensed using this laminar-flow, water-based condensation devices. A tube lined with a wetted wick through which the aerosol sample stream passes may be used. The walls of the first portion of this wick-lined tube are held at a first temperature and act as a preconditioner. The walls of the second portion of the tube are heated to at temperature greater than the first temperature. In this second portion, called the "growth region", the relatively faster diffusion of water vapor from the warm, wet walls as compared to the warming of the flow creates a region of supersaturation, particle activation and condensational growth. A particle-free sheath air may be used to surrounds the particle-laden aerosol flow so as to confine the particles to the centerline, where the highest super-saturation is achieved. Aerosol Devices (Fort Collins, Colo.) provides a condensation growth tube system that could be integrated into system 100.

The '421 U.S. Patent discloses a method comprising the steps of: providing a growth chamber having walls at a first temperature, providing a warm sheath flow containing a high concentration of a condensable vapor (water vapor in a carrier gas such as air) at a second temperature lower than the first temperature and introducing an laminar aerosol flow with the sheath flow, wherein the aerosol flow temperature is at a third temperature lower than the first temperature and the second temperature. This sheath flow is introduced in a laminar manner to surround the colder aerosol flow. Within the chamber containing the combined flows a region of vapor super-saturation is created as a result of the differential rates of thermal and mass transport. As a result, the vapor condenses on the particles, enlarging them into droplets. The sheath flow may be temperature conditioned prior to entering the condensation growth region. This method may be used to grow particles as small as 3.2 nm in diameter. The condensable vapor may comprise methanol in a carrier gas comprising at least one of air, carbon dioxide and argon.

U.S. Pat. No. 9,821,263 titled "ADVANCED LAMINAR FLOW WATER CONDENSATION TECHNOLOGY FOR ULTRAFINE PARTICLES," discloses a method for growing aerosol particle size comprising introducing an airstream in a laminar flow into a wet-walled condenser having an inlet and an outlet, the airstream having an inlet temperature at the inlet of the condenser, controlling a first portion of the condenser adjacent to the inlet to a first temperature greater than the inlet temperature by at least 5° C., and controlling a second portion of the condenser between the first portion and the outlet at a second temperature lower than the first temperature. The first portion and the second portion of the condenser define a volume, wherein introducing the airstream into the condenser creates a volumetric air flow rate within the volume, the volume having a cylindrical geometry or a multiple plate geometry wherein each plate has a width and a separation between plates. For a cylindrical geometry tube, the length of the first portion divided by the volumetric flow rate is less than $0.5$ s/cm$^2$ and for a multiple plates geometry a quantity of the length of the first portion divided by the volumetric flow rate multiplied a quantity of the width divided by the separation is less than $0.5$ s/cm$^2$. The walls of the condensation growth tubes may be wetted using a wick. U.S. Pat. No. 9,610,531, "WICK WETTING FOR WATER CONDENSATION SYSTEMS," discloses passive wetting of the wicks which may form the wetted walls of the laminar flow water condensation growth systems wherein the self-sustaining wick relies on capillary action of the wick material to transport water from colder regions where water vapor condenses onto the wick surface to warmer sections where it evaporates. This approach allows extended operation without a water reservoir and is insensitive to orientation of the growth tube. A siphoned wick may use a siphon-like method to maintain a water-filled gap behind the wick on a side of the wick opposite the air flow. This approach may be supplemented with active pumping to accommodate large systems. In one aspect, more than one condensation growth tube may be used to grow target aerosol particles of different sizes or diameters by controlling the temperature profiles in the growth tubes.

The aerosol exiting the nebulizer (or a portion of the aerosol) may be routed to the condensation growth tube. The design (length, diameter and operating temperature) of the condensation growth tube may be optimized based on the particle load (counts) in the aerosol exiting the nebulizer, and the flow rate into the condensation growth tube and the flow rate of the carrier gas, which is typically filtered air. The Aerosol Devices condensation growth tube system provides growth tubes that are about 4.5 in. in length and can process flow rates between about 1 LPM and 1.5 LPM per tube. The BioSpot VIVAS (Aerosol Devices) can handle a flow of 8 LPM through 8 tubes.

The aerosol exiting the condensation growth tube may be deposited on to sample disk 112 as dry or wet particles. Nozzle 1101 may be designed to generate the optimal impaction velocity of the target droplet. The optimal velocity for nozzle diameters ranging from 0.35-0.7 mm is in the range of 50-100 m/s. In order to achieve efficient collection of the target particles on sample disk 112, and to minimize or eliminate particle bounce, it may be beneficial to deposit aerosol particles that are wet. During or after collection, liquid water may be removed by drying the disk 112 as previously disclosed. An important aspect of the nebulization is to entrain the aerosol in a low volume of filter air. If the volumetric flow rate of air existing the nebulizer is large relative to the volumetric flow rate accepted by the condensation growth tube, then only a fraction of the nebulizer outlet will be directed into the growth tube. Alternatively, a bundle of condensation growth tubes may be used downstream of the nebulizer to create an aerosol with a mean diameter greater than 1 micron. This flow may then be concentrated in a virtual impactor prior to being directed into the impactor.

In exemplary system 100, station 106 may comprise in addition to TOF-MS mass spectral analysis, one or more optical detection tools and methods, because when the analyte deposited sample on disk 112 absorbs sufficient light energy from a laser pulse, it emits characteristic photons as they transition from a high-energy state to a lower energy state and generate transient optical signatures such as high-order fluorescence, laser-induced breakdown spectroscopy (LIBS), Raman spectra, and infrared spectra. Therefore, in additional to mass spectrometry, optical sensors/detectors may be used to identify the composition of the sample particles. Measured data collected using both TOF-MS and optical sensors may be processed using data fusion techniques to provide information on the composition of the sample analytes. By collecting information from a variety of detectors that include one or more optical methods and mass spectrometry, it is possible to filter and analyze the data associated with the sample using data fusion protocols to rapidly (close to real-time) identify the composition and type of particles with a high accuracy, sensitivity, and specificity. Data from each of the measurements comprising at least one of TOF-MS, LIBS, Raman spectroscopy and infrared spectroscopy, may be transferred to a sensor data fusion engine where artificial intelligence tools including machine learning and deep learning may be employed to fully characterize the particles.

RAMAN spectroscopy does not employ target-specific reagents and has a potential to be rapid (approximately five minutes or less). Raman spectroscopy provides information about molecular vibrations that can be used for sample identification and quantitation. The technique involves focusing a laser beam (e.g. a UV laser source with wavelength between about 330 and about 360 nm) on a sample and detecting inelastic scattered light. The majority of the scattered light is of the same frequency as the excitation source and is known as Rayleigh or elastic scattering. A very small amount of the scattered light is shifted in energy from the laser frequency, due to interactions between the incident electromagnetic waves and the vibrational energy levels of the molecules in the sample. Plotting the intensity of this "shifted" light versus frequency results in a Raman spectrum of the sample. A limitation of RAMAN spectroscopy is that is has difficulty resolving near neighbors in a genus or species where some members of the group are pathogenic to humans and some are not.

In LIBS, a laser pulse (e.g. from a high energy Nd:YAG laser with a wavelength of about 1064 nm) is focused on the particle to ablate a small amount of the particle to generate a plasma. The analyte particle breakdown (dissociate) into ionic and atomic species. When the plasma cools, characteristic atomic emission lines of the elements may be observed using an optical detector such as a CCD detector. In fluorescence spectroscopy, the sample molecules are excited by irradiation at a certain wavelength and emit radiation of a different wavelength. The emission spectrum provides information for both qualitative and quantitative analysis. When light of an appropriate wavelength is absorbed by a molecule, the electronic state of the molecule changes from the ground state to one of many vibrational levels in one of the excited electronic states. Once the molecule is in this excited state, relaxation can occur via several processes. Fluorescence is one of these processes and results in the emission of light. By analyzing the different frequencies of light emitted in fluorescent spectroscopy, along with their relative intensities, the chemical structure associated with different vibrational levels can be determined. Certain amino acids in biological samples, for example tryptophan, have high fluorescent quantum efficiencies, which favors the use of fluorescent spectroscopy for identifying these amino acids.

In exemplary system 100, station 106 may comprise in addition to TOF-MS mass spectral analysis, one or more optical detection tools and methods, because when the analyte deposited sample on disk 112 absorbs sufficient light energy from a laser pulse, it emits characteristic photons as they transition from a high-energy state to a lower energy state and generate transient optical signatures such as high-order fluorescence, laser-induced breakdown spectroscopy (LIBS), Raman spectra, and infrared spectra. Therefore, in additional to mass spectrometry, optical sensors/detectors may be used to identify the composition of the sample particles. Measured data collected using both TOF-MS and optical sensors may be processed using data fusion techniques to provide information on the composition of the sample analytes. By collecting information from a variety of detectors that include one or more optical methods and mass spectrometry, it is possible to filter and analyze the data associated with the sample using data fusion protocols to rapidly (close to real-time) identify the composition and type of particles with a high accuracy, sensitivity, and specificity. Data from each of the measurements comprising at least one of TOF-MS, LIBS, Raman spectroscopy and infrared spectroscopy, may be transferred to a sensor data fusion engine where artificial intelligence tools including machine learning and deep learning may be employed to fully characterize the particles.

EXAMPLES

Example 1. Detection of Biological Aerosol Particles Using Exemplary System 100

Figure 5:
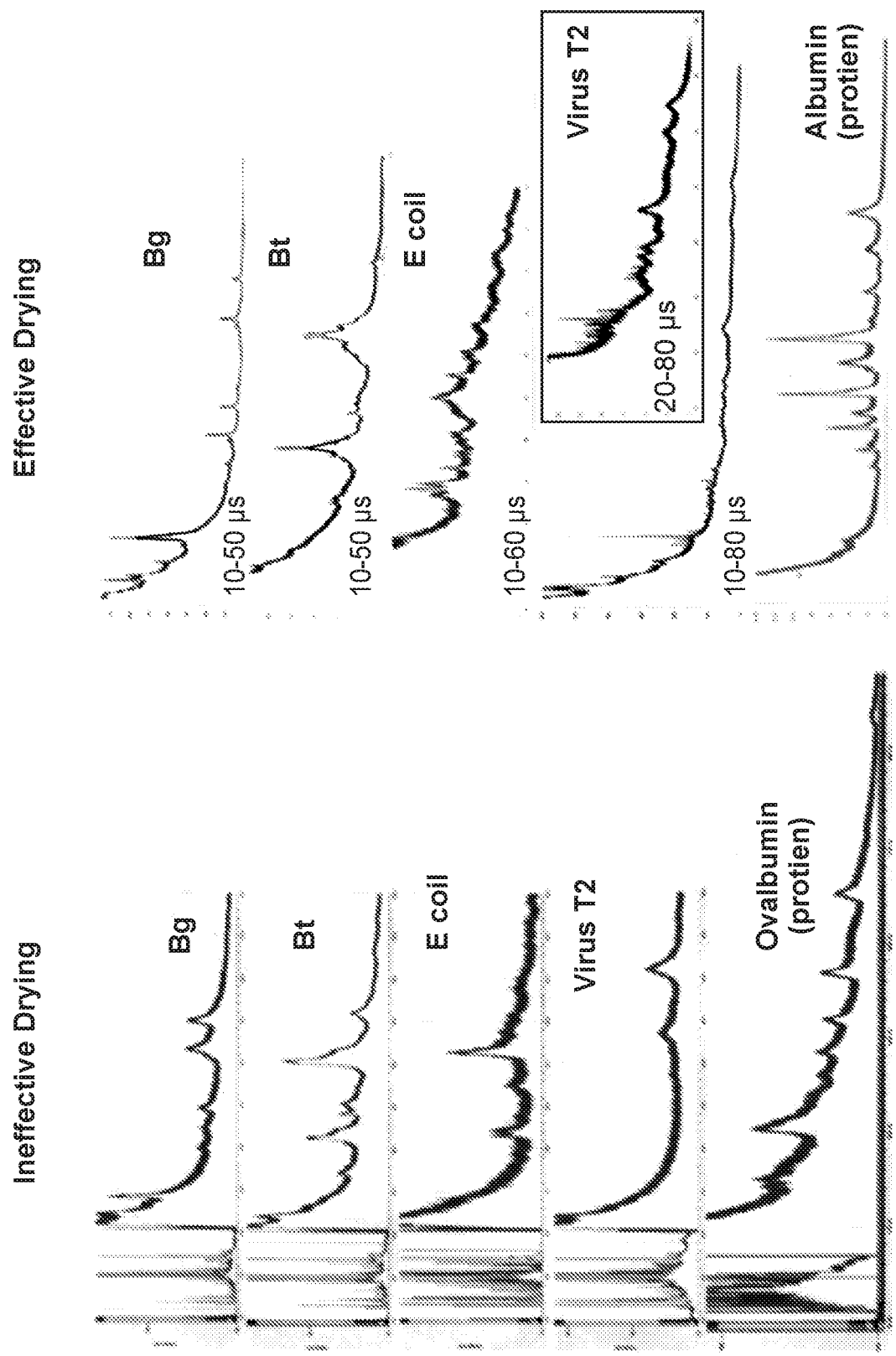

In an exemplary test, samples comprising *Bacillus subtilis* var *niger* ("Bg"), *Bacillus thuringiensis* ("Bt"), *Escherichia coli*, Enterobacteria phage T2 virus, and an albumin (protein) with molecular weight of 66 kDa were deposited on MALDI coated disks. The samples were then treated with a solution comprising 70% methanol, 10% TFA and 15% water. The samples were dried and analyzed using exemplary system 100 that comprised a TOFMS. In each case, the sample was dried, the sample stub comprising the disk with the sample was moved to MS station 106 and evacuated in the MS system. FIG. 5 shows raw (unprocessed) mass spectra for each of these samples under two conditions: (a) samples that were not substantially dried (or ineffectively dried) and samples that were effectively dried by evacuating at $< about 10^{-5}$ torr. As can be seen, effectively dried samples in each case, resulted in increased signal intensity of peaks (relative abundance of fragmented ions), peak sharpening, identification of new fragments, and a spectral fingerprint that allowed for better comparison with spectral libraries compared to the samples that were not effectively dried.

Example 2. Sensitivity of TOFMS Analysis Using Exemplary System 100

A sample comprising biological aerosol particles comprising spores, vegetative bacteria, and virus was drawn into a chamber of volume of about 250 liters and nebulized using make-up air to achieve a particle concentration of 1000 parts per liter (ppl). The chamber comprised a mixing fan to stir and mix the sampled air to a get a homogeneous sample of aerosol particles in air. A sample from the chamber was then drawn and a flow rate of about 4 liters per min (LPM) aerosol particles were deposited a MALDI coated disk by impaction. Prior to deposition, an inline APS/Fluorescence sensor was used to measure particle size distribution, count the number of bioparticles (fluorescent), count the number of non-biological particles and to determine the target particle to clutter ratio. The sample was then analyzed using TOFMS. Sensitivity of between about 50 and about 100 spores in air was demonstrated.

Example 3. High Specificity Detection of Biological Aerosol Particles Comprising Bg Spores Using Exemplary System 100

Figure 6:
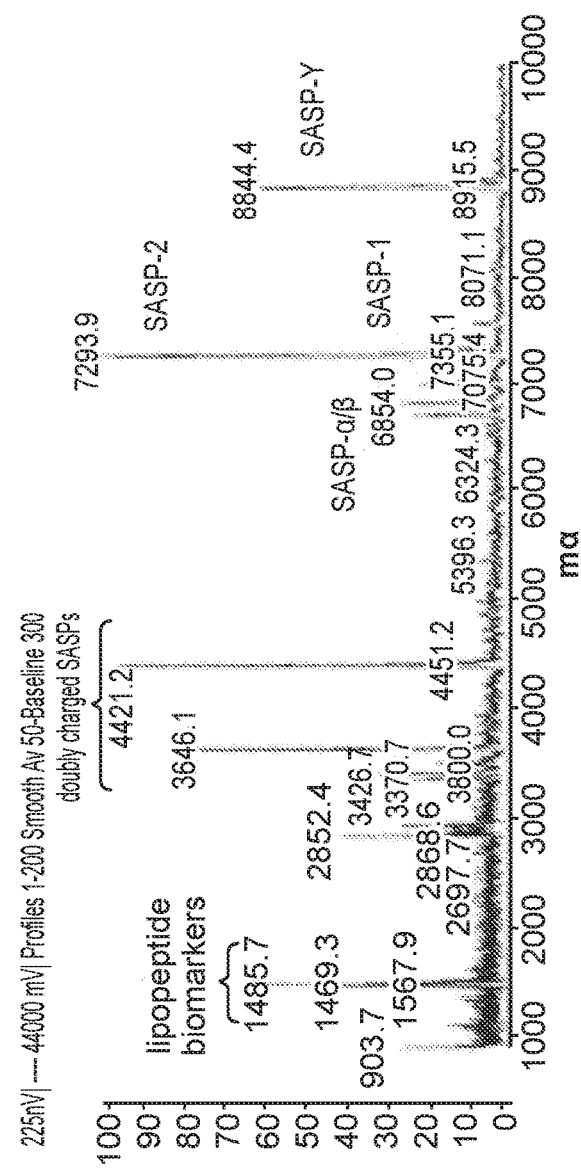
Figure 6:
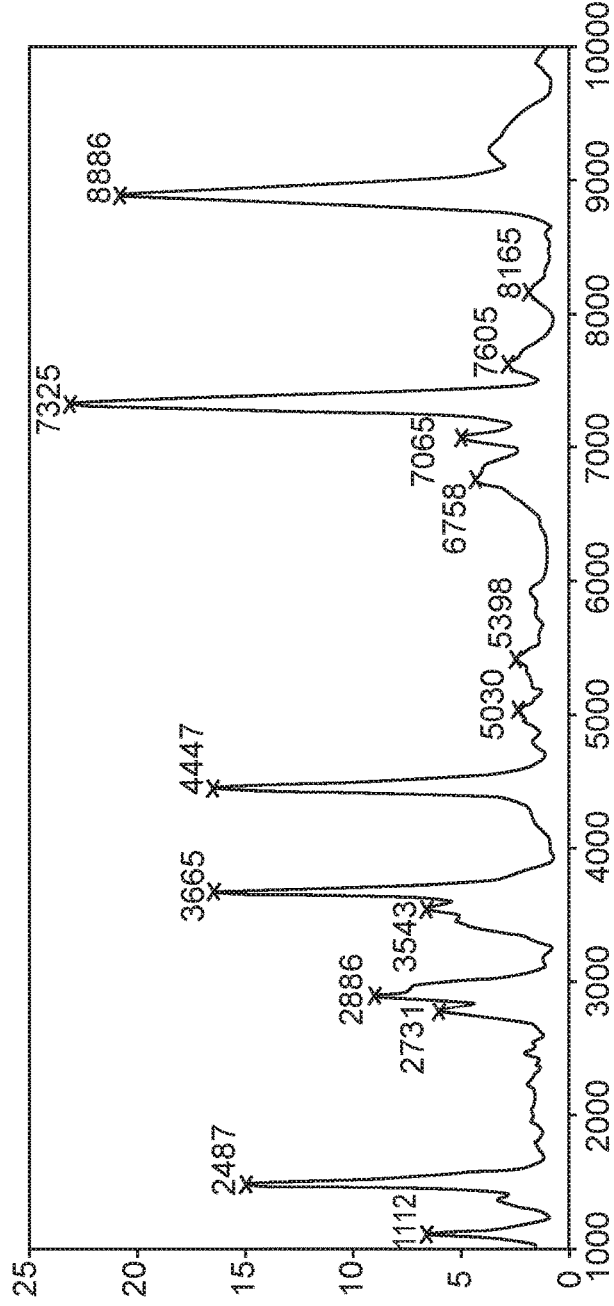

Aerosol samples comprising Bg spores were captured and analyzed using exemplary system 100 and compared with library baseline reference Bg mass spectrum. As shown in FIG. 6, the features of the measured spectrum highly correlated with that of the reference spectrum and demonstrated excellent specificity (mass resolution) capability of the exemplary system and data processing tools.

Example 4. High Specificity Detection of Biological Aerosol Particles Comprising Bt Spores Using Exemplary System 100

Figure 7:
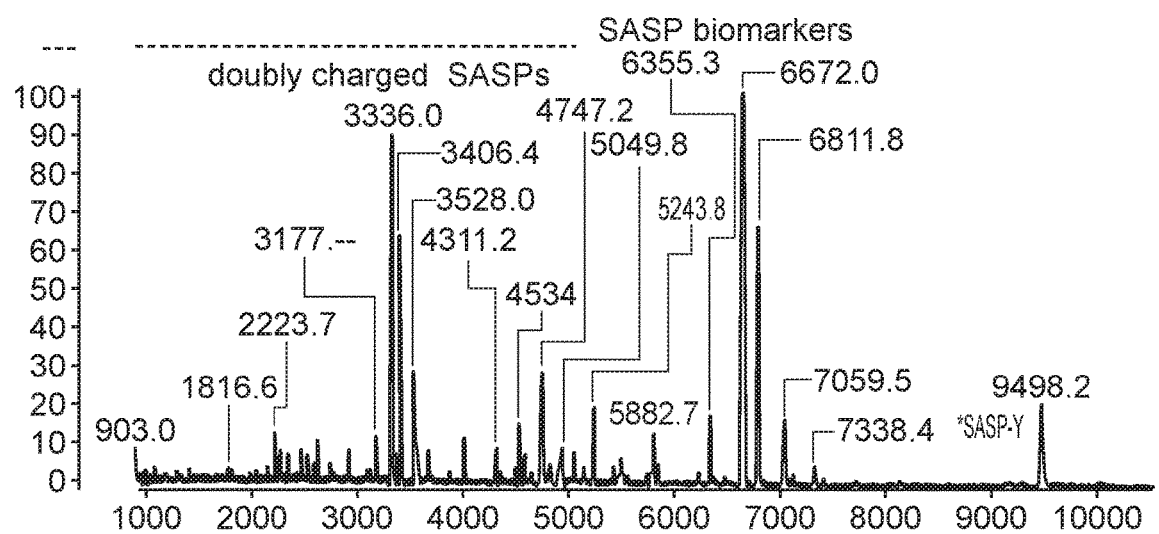
Figure 7:
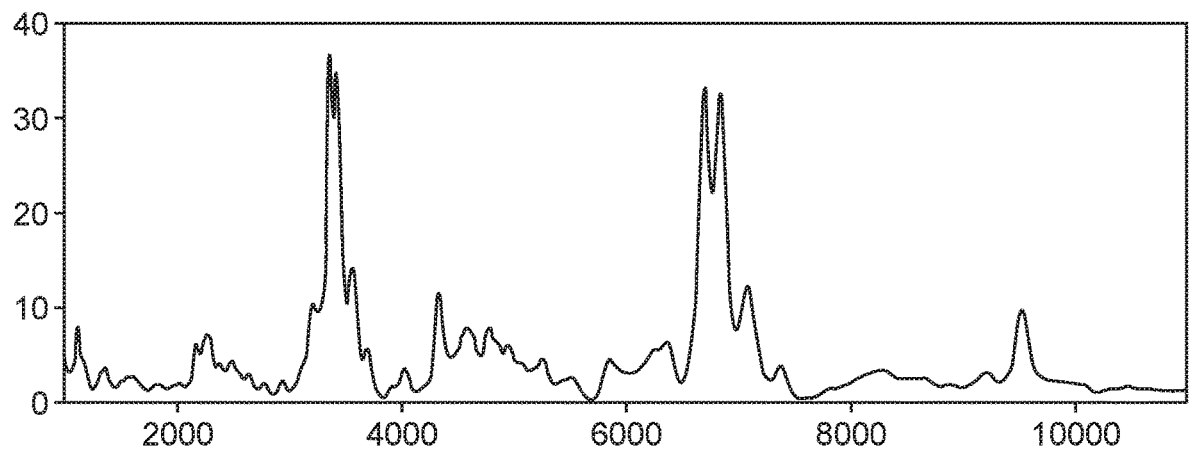

Aerosol samples comprising Bt (*Bacillus thuringiensis* al Hakam) spores were captured and analyzed using exemplary system 100 and compared with library baseline reference Bt mass spectrum. As shown in FIG. 7, the features of the measured spectrum highly correlated with that of the reference spectrum and demonstrated excellent specificity (mass resolution) capability of the exemplary system and data processing tools.

Example 5. High Specificity Detection of Biological Aerosol Particles Using Exemplary System 100

Figure 8:
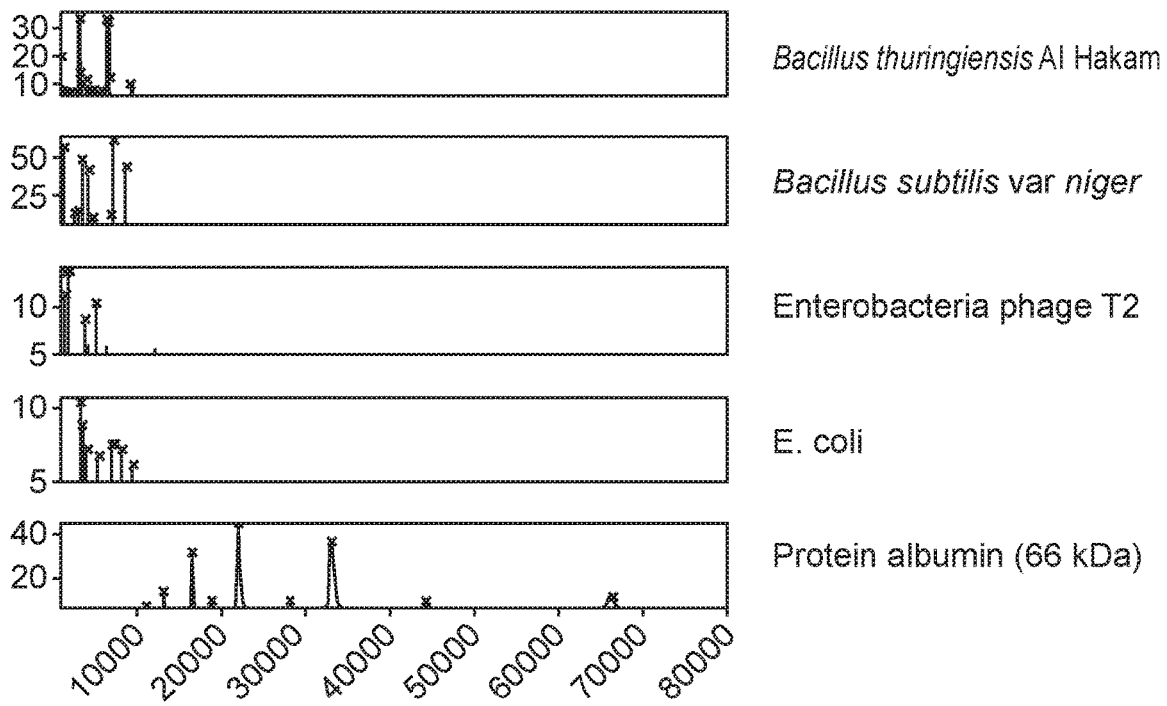
Figure 8:
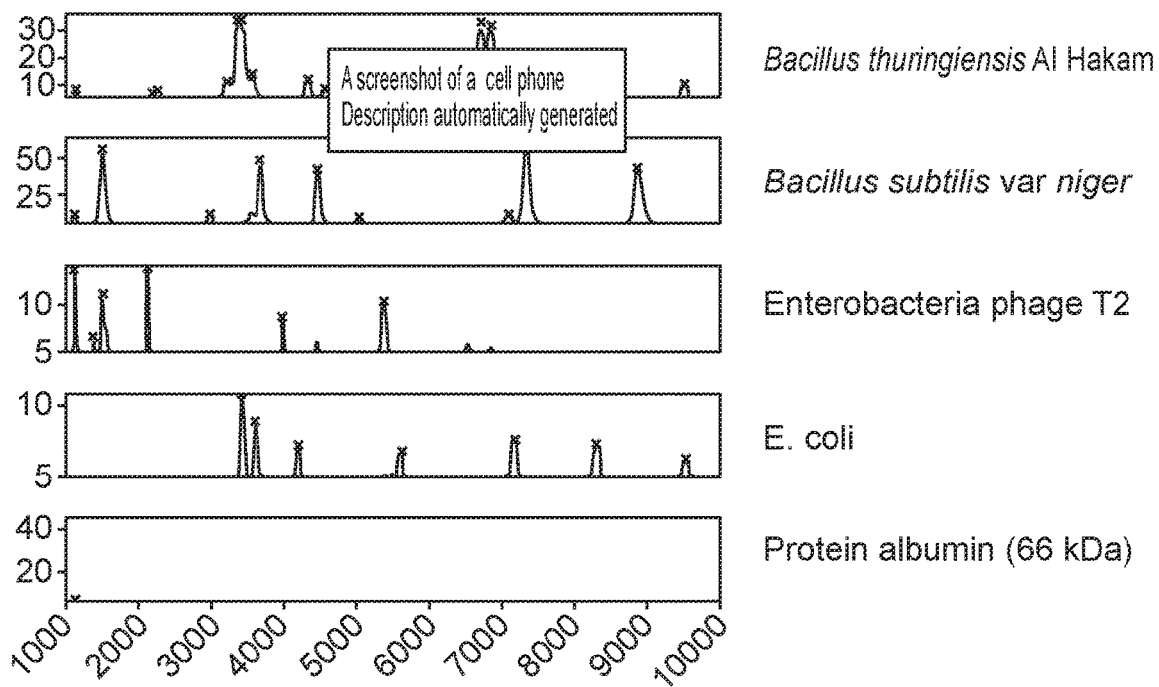

Aerosol samples comprising Bt, Bg, *E. coli* and albumin (66 kDa) were captured and analyzed using exemplary system 100. As shown in FIG. 8, spectral features of these bio particles over the full mass range (80 kDa) were identified.

Example 6. High Sensitivity Detection of Biological Aerosol Particles Comprising Bg Particles Using Exemplary System 100

Figure 9:
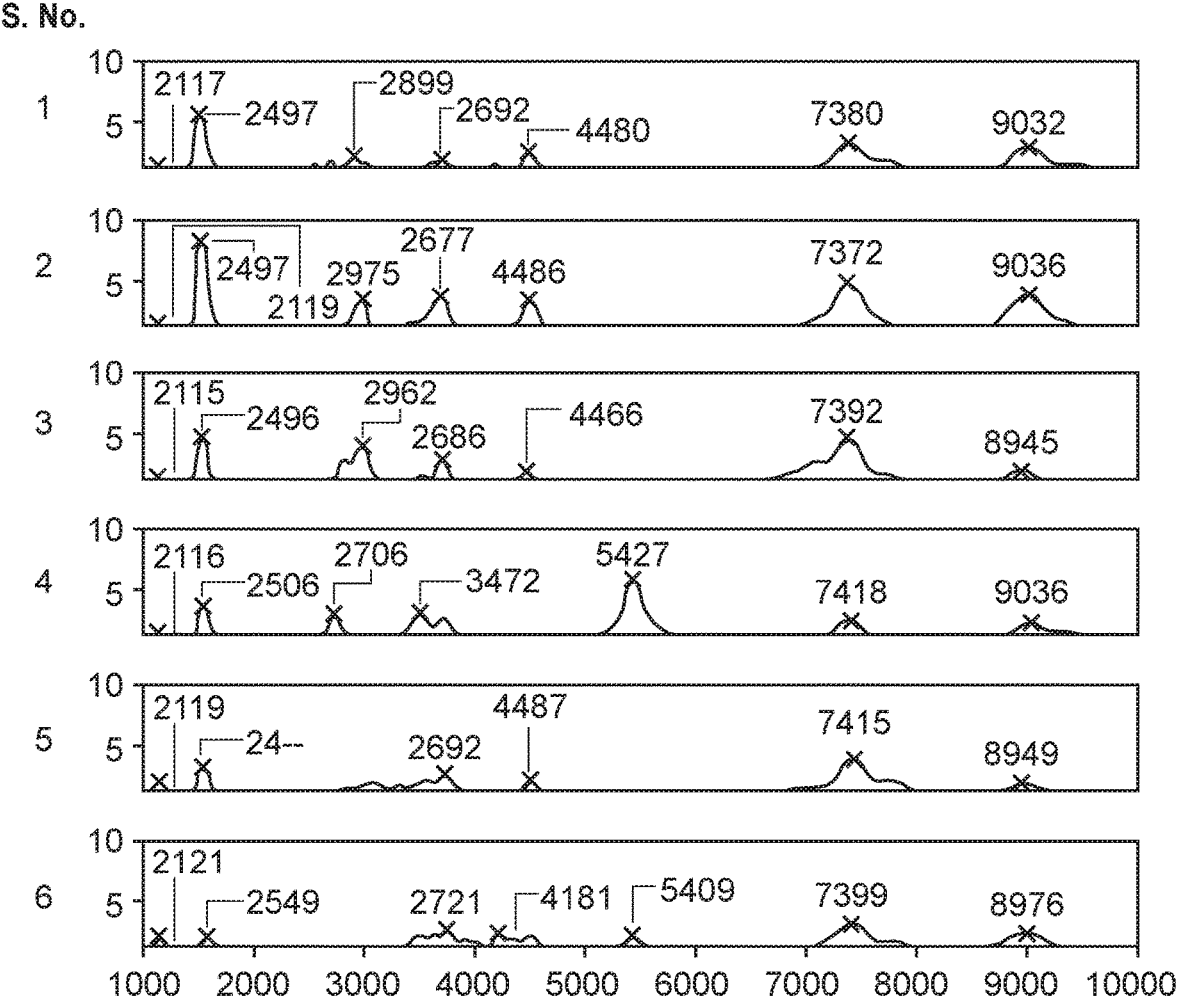

Aerosol samples comprising Bg particles with Bg particle to background particle ratios of between about 0.05 and about 0.56 were captured and analyzed using exemplary system 100. As shown in FIG. 9, sensitivity for Bg detection over this concentration range was excellent as Bg spectral features were identified.

Example 7. High Sensitivity Detection of Biological Aerosol Particles Comprising *E. coli* Using Exemplary System 100

Aerosol samples comprising *E. coli* were captured and analyzed using exemplary system 100 and compared with baseline reference mass spectrum. As shown in FIG. 14, the features of the measured spectrum highly correlated with that of the reference spectrum and demonstrated excellent specificity (mass resolution) capability of the exemplary system and data processing tools.

Example 8. High Sensitivity Detection of Biological Aerosol Particles Comprising *Y. rohdei* Using Exemplary System 100

Aerosol samples comprising *Y. rohdei* were captured and analyzed using exemplary system 100 and compared with baseline reference mass spectrum. As shown in FIG. 15, the features of the measured spectrum highly correlated with that of the reference spectrum and demonstrated excellent specificity (mass resolution) capability of the exemplary system and data processing tools.

Example 9. High Sensitivity Detection of Biological Aerosol Particles Comprising *E. coli* Bacteriophage MS2 Virus Particles Using Exemplary System 100

Aerosol samples comprising *E. coli* bacteriophage MS2 virus were captured and analyzed using exemplary system 100. As shown in FIG. 16, the features of the measured spectrum demonstrated excellent specificity (mass resolution) capability of the exemplary system and data processing tools.

The Abstract is provided to comply with 37 C.F.R. § 1.72(b), to allow the reader to determine quickly from a cursory inspection the nature and gist of the technical disclosure. It should not be used to interpret or limit the scope or meaning of the claims.

Although the present disclosure has been described in connection with the preferred form of practicing it, those of ordinary skill in the art will understand that many modifications can be made thereto without departing from the spirit of the present disclosure. Accordingly, it is not intended that the scope of the disclosure in any way be limited by the above description.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these. Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this disclosure is entitled. It should be understood that all actions may be expressed as a means for taking that action or as an element which causes that action. Similarly, each physical element disclosed should be understood to encompass a disclosure of the action which that physical element facilitates.

In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Further, the use of the transitional phrase "comprising" is used to maintain the "open-end" claims herein, according to traditional claim interpretation. Thus, unless the context requires otherwise, it should be understood that variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible.

What is claimed is:

1. An autonomous sample capture and analysis system for analyzing aerosol analyte particles in air, the system comprising:
    a fresh sample disk or substrate loader station configured to receive a fresh disk cartridge having one or more fresh disks;
    a spent sample disk or substrate loader station configured to receive a spent disk cartridge;
    an aerosol sample collection station;
    a sample disk holder comprising a metal stub and configured to:
        removably engage with the fresh disk cartridge disposed at the fresh sample disk station to receive a fresh sample disk;
        removably engage with the spent disk cartridge disposed at the spent sample disk station to return a spent sample disk;
        hold a fresh sample disk or a spent sample disk; and
        move in at least two directions (X-Y-Z) orthogonal to each other using at least one of a stepper motor and actuator using a predetermined analysis sequence; and
    one or more analysis stations wherein the aerosol sample collection station is configured to produce a sample spot on a fresh disk when the sample disk holder is positioned at the collection station and wherein the operation of the system is controlled using a microcontroller configured to run a predetermined analysis sequence.

2. The system of claim 1 wherein the system further comprises at least one of a camera station, a liquid chemical dispensing station, and a drying station.

3. The system of claim 2 wherein the aerosol sample collection station is configured to produce a sample spot size of about 1 mm in diameter on the sample disk wherein the aerosol sample collection station comprises a tubing disposed in fluid communication with ambient air at one end and an impactor nozzle having a nozzle tip disposed at the other end of the tubing at a predetermined spacing above the sample disk wherein:
the nozzle tip has a hole diameter of between about 0.35 mm and about 1 mm; and,
the predetermined spacing between the nozzle tip and the sample disk is between about 0.35 mm and about 1 mm.

4. The system of claim 2 wherein the dispensing station is configured to dispense between about 0.5 µl and about 2 µl of a liquid.

5. The system of claim 4 wherein the liquid comprises at least one of MALDI matrix chemical, TFA, acetonitrile, methanol, ethanol, and water.

6. The system of claim 2 wherein the camera station is configured to receive at least one of a microscope camera and a digital camera.

7. The system of claim 2 wherein the drying station is configured to substantially dry the sample using at least one of inductive heating, resistive heating, flow of air, and vacuum and combinations thereof.

8. The system of claim 1 wherein the disks are pre-coated with a MALDI matrix chemical.

9. The system of claim 1 wherein the sample disk is made of at least one of nickel and nickel alloys.

10. The system of claim 1 wherein the system is configured to communicate with a remote server using at least one of wired communication and wireless communication wherein the output of the analysis station is transferred to the remote server and then to a data processing station for data processing.

11. The system of claim 1 wherein the system is configured to communicate with a data processing station using at least one of wired communication and wireless communication wherein the output of the analysis station is transferred to the data processing station for processing.

12. The system of claim 1 wherein the one or more analysis stations comprises at least one of a TOFMS, LDI-MS, MALDI-TOFMS, LIBS, Raman spectroscopy, fluorescence microscopy, surface enhanced RAMAN spectroscopy, scanning electron microscopy IR spectroscopy and an optical detector.

13. The system of claim 1 further comprising a fluorescence sensor disposed upstream of the sample collection station to measure at least one of particle size distribution, particle count, and target analyte particle to clutter particle ratio.

14. A method for collecting and analyzing aerosol analyte sample particles in air using the system of claim 13, the method comprising:
loading a fresh sample disk onto the sample disk holder at the fresh sample disk loader station;
measuring particle counts in ambient air;
when the particle counts exceed a predetermined threshold moving the sample disk holder having a fresh disk to the aerosol collection station where aerosol particles are impacted onto the sample disk to deposit aerosol particles onto the disk to produce a sample spot size of about 1 mm in diameter on the sample disk;
moving the sample disk holder to the liquid chemical dispensing station for treating the deposited aerosol particles with chemicals;
moving the sample disk holder to the camera station for examination using at least one of a microscope camera and imaging using a digital camera;
substantially drying the sample; and,
moving the sample disk holder to the one or more analysis stations for sample analysis.

15. The method of claim 14 further comprising the steps of:
analyzing the sample using TOFMS;
transferring the output of the TOFMS to a remote server using at least one of the wired communication and wireless communication between the autonomous sample capture and analysis system and the server;
generating raw spectral data unique to the aerosol analyte particles;
performing at least one of filtering, baseline subtraction, signal to noise ratio estimation, peak detection, and feature extraction to generate processed spectral data; and,
identifying the composition of the aerosol analyte particle by comparing the processed spectral data with a reference library comprising processed spectral data of several biological and chemical analytes.

16. The method of claim 14 wherein sample disk is pre-coated with a MALDI matrix chemical.

17. An autonomous sample capture and analysis system for analyzing a liquid sample, the system comprising:
a fresh sample disk or substrate loader station configured to receive a fresh disk cartridge having one or more fresh disks;
a spent sample disk or substrate loader station configured to receive a spent disk cartridge;
a liquid sample acceptance station configured to receive the liquid sample;
a liquid chemical dispensing station;
a sample disk holder comprising a metal stub and configured to:
removably engage with the fresh disk cartridge disposed at the fresh sample disk station to receive a fresh sample disk;
removably engage with the spent disk cartridge disposed at the spent sample disk station to return a spent sample disk;
hold a fresh sample disk or a spent sample disk; and
move in at least two directions (X-Y-Z) orthogonal to each other using at least one of a stepper motor and actuator using a predetermined analysis sequence; and,
one or more analysis stations wherein the liquid sample acceptance station is station is configured to produce a sample spot on a fresh disk and wherein the operation of the system is controlled using a microcontroller configured to run a predetermined analysis sequence.

18. The system of claim 17, wherein the liquid sample acceptance station is configured to receive a liquid sample from an aerosol collection device.

19. The system of claim 18 wherein the aerosol collection device comprises at least one of an impactor, a rotating impactor with continuous or intermittent rinsing, a cyclone with continuous or intermittent rinsing, a wet-walled impactor, and a liquid impinger.

20. The system of claim 17 wherein the liquid sample acceptance station is configured to receive a liquid sample comprising exhaled breath.

21. The system of claim 17 wherein the liquid sample acceptance station is configured to receive a liquid sample obtained from a liquid sample processing device capable of at least one of purifying, digesting, and concentrating target analytes.

22. A method for collecting and analyzing aerosol particles, the method comprising:
  collecting aerosol particles into a liquid;
  subjecting the liquid sample to at least one of enzyme and hot acid treatment and generating peptides characteristic of the aerosol sample;
  adding MALDI matrix solution to the treated sample; and,
  drying and analyzing the sample using the system of claim 17.

23. An autonomous sample capture and analysis system for capturing and analyzing contaminant particles in a liquid sample, the system comprising:
  a nebulizer to produce an aerosol comprising contaminant particles in a carrier gas;
  at least one condensation growth tube to enlarge the size of the contaminant particles in the aerosol to a predetermined average particle diameter;
  a fresh sample disk or substrate loader station configured to receive a fresh disk cartridge having one or more fresh disks;
  a spent sample disk or substrate loader station configured to receive a spent disk cartridge;
  an aerosol sample collection station;
  a liquid chemical dispensing station;
  a camera station configured to receive at least one of a microscope camera and a digital camera;
  a drying station to substantially dry the sample under vacuum; and,
  a sample disk holder comprising a metal stub and configured to:
    removably engage with the fresh disk cartridge disposed at the fresh sample disk station to receive a fresh sample disk;
    removably engage with the spent disk cartridge disposed at the spent sample disk station to return a spent sample disk;
    hold a fresh sample disk or a spent sample disk; and
    move in at least two directions (X-Y-Z) orthogonal to each other using at least one of a stepper motor and actuator using a predetermined analysis sequence; and,
  one or more analysis stations wherein the aerosol sample collection station is configured to produce a sample spot on a fresh disk when the sample disk holder is positioned at the collection station and wherein the operation of the system is controlled using a microcontroller configured to run a predetermined analysis sequence.

24. The system of claim 23 wherein the one or more analysis stations comprises at least one of a LDI-MS, a MALDI-TOFMS, LIBS, Raman spectroscopy, fluorescence microscopy, surface enhanced RAMAN spectroscopy, scanning electron microscopy, IR spectroscopy and an optical detector.

25. The system of claim 24 wherein the disks are pre-coated with a MALDI matrix chemical.

26. The system of claim 23 wherein the sample disk is made of at least one of nickel and nickel alloys.

27. The system of claim 23 wherein the dispensing station is configured to dispense between about 0.5 µL and about 2 µL of a liquid.

28. The system of claim 27 wherein the liquid comprises at least one of TFA, acetonitrile, methanol, ethanol, and water.

29. The system of claim 23 further comprising a fluorescence sensor disposed upstream of the sample collection station to measure at least one of particle size distribution, particle count, and target analyte particle to clutter particle ratio.

30. The system of claim 23 further comprising a data processing station for acquiring an processing data output from the one or more analysis stations to identify the composition of the contaminant particles.

31. The system of claim 23 wherein the liquid sample comprises at least one of UPW, and chemical liquids used during semiconductor fabrication.

32. A method for capturing and analyzing contaminant particles in a liquid sample using the system of claim 23, the method comprising:
  nebulizing the liquid sample to produce an aerosol comprising contaminant particles in a carrier gas;
  growing the size of the contaminant particles in the aerosol using at least one condensation growth tube to produce enlarged contaminant aerosol particles of predetermined average particle diameter;
  loading a fresh sample disk onto the sample holder at the fresh sample disk loader station;
  moving the sample holder having a fresh disk to the aerosol sample collection station where the enlarged contaminant aerosol particles are impacted onto the sample disk;
  moving the sample holder to the liquid chemical dispensing station for treating the deposited aerosol particles with chemicals;
  moving the sample holder to a camera station for examination using at least one of a microscope camera and imaging using a digital camera;
  drying the sample; and,
  moving the sample holder to an the one or more analysis stations for sample analysis.

33. The method of claim 32 further comprising measuring at least one of particle size distribution, particle count, and target analyte particle to clutter particle ratio using a fluorescence sensor disposed upstream of the sample collection station.

34. The method of claim 32 wherein the one or more analysis stations comprises at least of one of a LDI-MS, MALDI-TOFMS, LIBS, Raman spectroscopy, fluorescence microscopy, surface enhanced RAMAN spectroscopy, scanning electron microscopy, optical detector, and IR spectroscopy.

35. The method of claim 32 further comprising the steps of:
  analyzing the sample using TOFMS;
  transferring the output of the TOFMS to a remote server using at least one of the wired communication and wireless communication between the autonomous sample capture and analysis system and the server;
  generating raw spectral data unique to the aerosol analyte particles;
  performing at least one of filtering, baseline subtraction, signal to noise ratio estimation, peak detection, and feature extraction to generate processed spectral data; and,
  identifying the composition of the contaminant particles by comparing the processed spectral data with a reference library comprising processed spectral data of several biological and chemical analytes.

36. The method of claim 35 wherein the identifying step further comprises using machine learning to compare spectral data with a training data set to predict contaminant particle composition.

* * * * *